(12) United States Patent
Chen et al.

(10) Patent No.: US 8,192,033 B2
(45) Date of Patent: Jun. 5, 2012

(54) FIXED-FOCUS LENS AND APPARATUS INTEGRATING OPTICAL PROJECTION AND IMAGE DETECTION

(75) Inventors: Jung-Yao Chen, Hsinchu (TW); Hsin-Te Chen, Hsinchu (TW)

(73) Assignee: Young Optics Inc., Hsinchu (TW)

( * ) Notice: Subject to any disclaimer, the term of this patent is extended or adjusted under 35 U.S.C. 154(b) by 396 days.

(21) Appl. No.: 12/559,767

(22) Filed: Sep. 15, 2009

(65) Prior Publication Data

US 2010/0231873 A1    Sep. 16, 2010

(30) Foreign Application Priority Data

Mar. 12, 2009   (TW) .............................. 98108048 A

(51) Int. Cl.
*G03B 21/28* (2006.01)
(52) U.S. Cl. ......................................................... 353/98
(58) Field of Classification Search .................... 353/98; 359/726–736; 345/173, 175
See application file for complete search history.

(56) References Cited

U.S. PATENT DOCUMENTS

| | | | |
|---|---|---|---|
| 6,147,812 A | 11/2000 | Narimatsu et al. | |
| 6,513,935 B2 | 2/2003 | Ogawa | |
| 6,563,650 B2 * | 5/2003 | Moskovich | 359/663 |
| 6,631,994 B2 | 10/2003 | Suzuki et al. | |
| 6,752,500 B1 | 6/2004 | Yoshii et al. | |
| 6,824,274 B2 | 11/2004 | Suzuki et al. | |
| 6,877,862 B2 | 4/2005 | Fukunaga et al. | |
| 7,411,737 B2 * | 8/2008 | Imaoka et al. | 359/649 |

FOREIGN PATENT DOCUMENTS

TW      I292052      1/2008

* cited by examiner

*Primary Examiner* — Georgia Y Epps
*Assistant Examiner* — Renee Naphas
(74) *Attorney, Agent, or Firm* — J.C. Patents

(57) ABSTRACT

A fixed-focus lens disposed between an object side and an image side is provided. The fixed-focus lens includes a reflector, a curved reflector, a first lens group, and a second lens group disposed in sequence from the object side to the image side. The first lens group includes two aspheric lenses. The second lens group includes a spherical lens and an aspheric lens, wherein the aspheric lens of the second lens group is closest to the image side in the second lens group. Besides, an effective focal length (EFL) of the fixed-focus lens is f, an EFL of the second lens group is $f_2$, and a clear aperture of the aspheric lens of the second lens group is D. The fixed-focus lens satisfies one of following conditions: $0.04<f/f_2<0.078$ and $0.05<f/D<0.18$. An apparatus integrating optical projection and image detection is provided.

24 Claims, 21 Drawing Sheets

FIXED-FOCUS LENS AND APPARATUS INTEGRATING OPTICAL PROJECTION AND IMAGE DETECTION

CROSS-REFERENCE TO RELATED APPLICATION

This application claims the priority benefit of Taiwan application serial no. 98108048, filed on Mar. 12, 2009. The entirety of the above-mentioned patent application is hereby incorporated by reference herein and made a part of specification.

BACKGROUND OF THE INVENTION

1. Field of the Invention

The present invention generally relates to a lens and an optical apparatus, and more particularly, to a fixed-focus lens and an apparatus integrating optical projection and image detection.

2. Description of Related Art

With the progress in science and technology, all kinds of optical products, such as digital cameras, digital camcorders, facsimile machines, photostat machines, optical disc players, scanners, rear projection display devices, and so on, have been gradually available to all in the daily lives while performance of the products is continually enhanced, and costs of the products are tinually reduced. Moreover, as the optical technology is highly developed, the rear projection display device is further developed to have integrated functions of optical projection and image detection. Image frames are generated by projecting a visible light on a screen, and positions and movements of fingers touching the screen are detected by means of an infrared detector, so that the function of a touch screen is achieved.

Since image frames displayed on a digital micro-mirror device (DMD) or a liquid-crystal-on-silicon panel (LCOS panel) are enlarged by a fixed-focus lens in the rear projection display device, the enlarged image frames are able to be displayed on the product with lower cost. However, in a conventional touch rear projection display device, since view angle of the fixed-focus lens is restricted, an image beam from the DMD or the LCOS panel is enlarged to an enough size after traveling a necessary distance, so that the enlarged image frame is displayed on the screen. On the other hand, infrared rays (IR) reflected by the screen also have to travel a necessary distance, so that IR images on a large-size screen are generated on a small-sized charge coupled device (CCD) or a small-sized complementary metal-oxide-semiconductor sensor (CMOS sensor). The necessary distance usually results in an excessive thickness of the rear projection display device, such that the rear projection display device may hardly compete with current flat panel displays.

SUMMARY OF THE INVENTION

The invention provides a fixed-focus lens having a large field of view (FOV) and a small image aberration.

The invention provides an apparatus integrating optical projection and image detection. The apparatus has a short image-detecting optical length and desirable optical properties.

In order to achieve one or a part of or all of the above advantages or other advantages, an embodiment of the invention provides a fixed-focus lens adapted to be disposed between an object side and an image side. The fixed-focus lens includes a reflector, a curved reflector, a first lens group, and a second lens group. The reflector is disposed in a light path between the object side and the image side. The curved reflector is disposed in the light path between the reflector and the image side. The first lens group is disposed in the light path between the curved reflector and the image side and includes a first lens and a second lens arranged in sequence from the object side to the image side. Each of the first lens and the second lens is an aspheric lens. The second lens group is disposed in the light path between the first lens group and the image side and includes a spherical lens and an aspheric lens. The aspheric lens of the second lens group is closest to the image side in the second lens group. An effective focal length (EFL) of the fixed-focus lens is f, an EFL of the second lens group is $f_2$, and a clear aperture of the aspheric lens of the second lens group is D, and the fixed-focus lens satisfies at least one of following conditions: $0.04 < f/f_2 < 0.078$ and $0.05 < f/D < 0.18$.

Another embodiment of the invention provides an apparatus integrating optical projection and image detection. The apparatus includes a fixed-focus lens, a light detector, and an optical engine. The fixed-focus lens is adapted to image an object beam from the object side on the image side. The fixed-focus lens disposed in the light path of the object beam between the first lens group and the second lens group includes a dichroic mirror and all of the elements of the above-described fixed-focus lens. The reflector is disposed in the light path of the object beam between the object side and the image side. The curved reflector is disposed in the light path of the object beam between the reflector and the image side. The first lens group is disposed in the light path of the object beam between the curved reflector and the image side. The second lens group is disposed in the light path of the object, beam between the first lens group and the image side. The light detector is disposed at the image side. The optical engine is adapted to emit an image beam. The image beam is transmitted to the dichroic mirror, and the dichroic mirror is capable of allowing the image beam to be transmitted to the first lens group. The image beam is capable of passing through the first lens group and is reflected to the object side by the curved reflector and the reflector.

In an embodiment of the invention, the object beam is a non-visible light beam, and the image beam is a visible light beam. The dichroic mirror is adapted to transmit the non-visible light beam from the first lens group to the second lens group. In an embodiment of the present invention, the dichroic mirror is adapted to be passed through by the non-visible light beam from the first lens group, so that the non-visible light beam is transmitted to the second lens group. An axis of the first lens group and an axis of the second lens group are not parallel to each other.

In an embodiment of the invention, the curved reflector is an aspheric reflector and has a negative refractive power. The first lens group has a negative refractive power, and the second lens group has a positive refractive power. The first lens and the second lens in the first lens group both have negative refractive powers. The first lens is a convex-concave lens with a convex surface facing the object side, and the second lens is a biconcave lens. The aspheric lens of the second lens group has a positive refractive power. Besides, the fixed-focus lens further includes a reflecting element disposed in the light path between the first lens group and the second lens group. The distance from the first lens group to the second lens group is $T_{12}$, and $1.8 < T_{12}/f_2 < 4.5$.

In an embodiment of the invention, the second lens group includes a third lens, a fourth lens, a fifth lens, and a sixth lens arranged in sequence from the object side to the image side. Refractive powers of the third lens, the fourth lens, the fifth lens, and the sixth lens, for example, are all positive. The sixth lens is the aspheric lens closest to the image side in the second lens group, and the fifth lens, for example, is an aspheric lens. The third lens is a biconvex lens, each of the fourth lens and the fifth lens is a concave-convex lens with a convex surface facing the object side, and the sixth lens is a concave-convex lens with a convex surface facing the image side. Besides, the fixed-focus lens further includes an aperture stop disposed in the light path between the third lens and the fourth lens.

In an embodiment of the invention, the second lens group includes a third lens, a fourth lens, and a fifth lens arranged in sequence from the object side to the image side. Refractive powers of the third lens, the fourth lens, and the fifth lens, for example, are all positive. The fifth lens is the aspheric lens closest to the image side in the second lens group, and the fourth lens is an aspheric lens. The third lens is a concave-convex lens with a convex surface facing the object side, the fourth lens is a convex-concave lens with a convex surface facing the object side, and the fifth lens is a concave-convex lens with a convex surface facing the image side. Besides, the fixed-focus lens further includes an aperture stop disposed in the light path between the first lens group and the second lens group.

In an embodiment of the invention, the second lens group includes a third lens, a fourth lens, a fifth lens, a sixth lens, and a seventh lens arranged in sequence from the object side to the image side. Refractive powers of the third lens, the fourth lens, the fifth lens, the sixth lens, and the seventh lens are sequentially positive, positive, positive, negative, and positive. The seventh lens is the aspheric lens closest to the image side in the second lens group, and the fifth lens is an aspheric lens. Each of the third lens and the fourth lens is a concave-convex lens with a convex surface facing the image side, each of the fifth lens and the seventh lens is a concave-convex lens with a convex surface facing the object side, and the sixth lens is a convex-concave lens with a convex surface facing the image side. Besides, the fixed-focus lens further includes an aperture stop disposed in the light path between the fourth lens and the fifth lens.

In an embodiment of the invention, the second lens group includes a third lens, a fourth lens, a fifth lens, a sixth lens, a seventh lens, and an eighth lens arranged in sequence from the object side to the image side. Refractive powers of the third lens, the fourth lens, the fifth lens, the sixth lens, the seventh lens, and the eighth lens are sequentially positive, negative, positive, negative, positive, and positive. The eighth lens is the aspheric lens closest to the image side in the second lens group. The fourth lens and the fifth lens together form a first double cemented lens, and the sixth lens and the seventh lens together form a second double cemented lens. Each of the third lens, the fifth lens, the seventh lens, and the eighth lens is a biconvex lens, the fourth lens is a biconcave lens, and the sixth lens is a convex-concave lens with a convex surface facing the object side. Besides, the fixed-focus lens further includes an aperture stop disposed in the light path between the third lens and the fourth lens.

In view of the above, in the fixed-focus lens of the embodiment of the invention, the reflector and the curved reflector are used together with the first lens group and the second lens group to eliminate image aberration, and thereby the fixed-focus lens may have a large field of view. Accordingly, the apparatus integrating optical projection and image detection may have a short image-detecting optical length by utilizing the fixed-focus lens.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
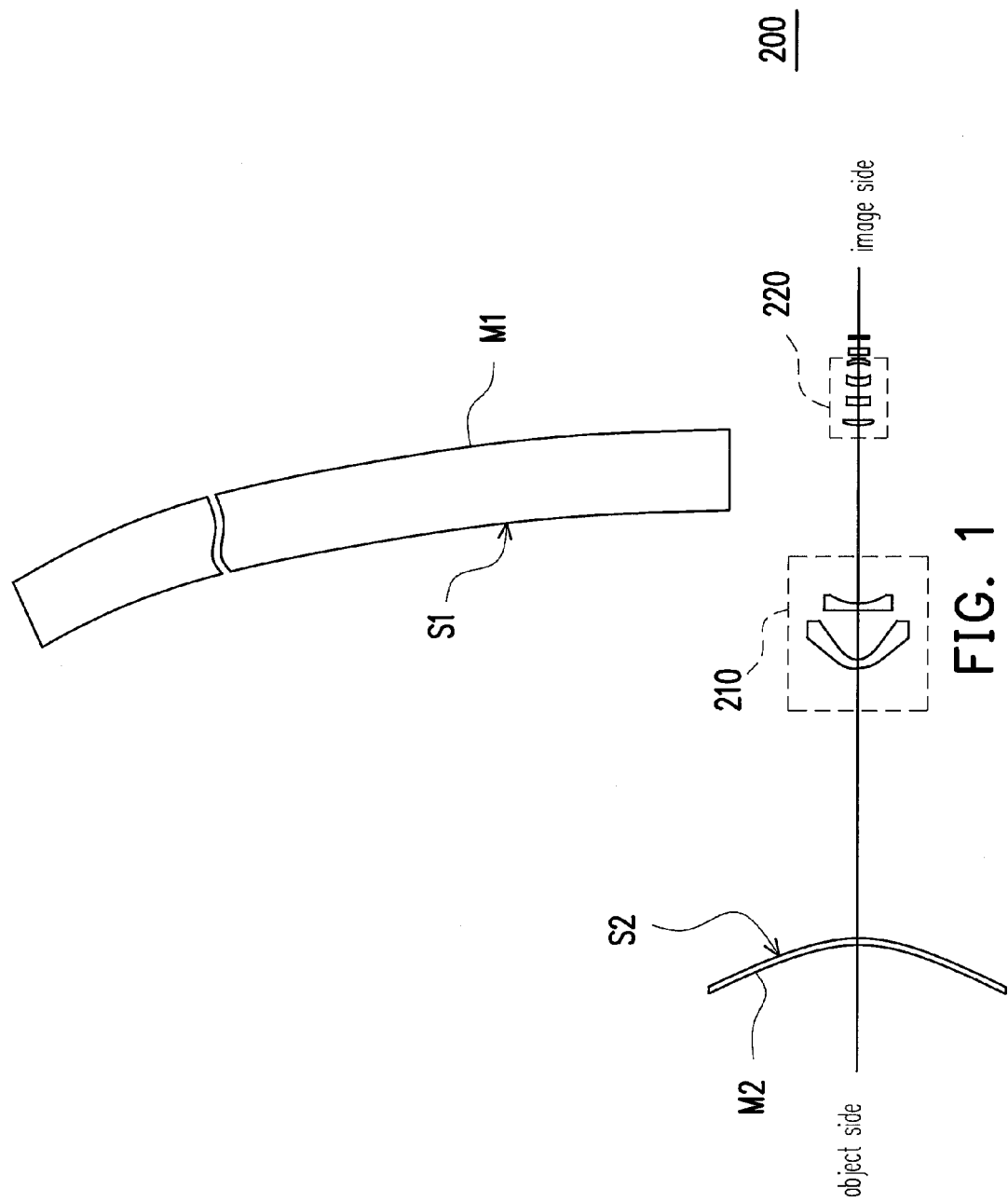
FIG. 1 is a schematic view illustrating the structure of a fixed-focus lens according to an embodiment of the invention.

Referring to FIG. 1, the fixed-focus lens 200 of the embodiment is adaptive to be disposed between an object side and an image side. The fixed-focus lens 200 includes a reflector M1, a curved reflector M2, a first lens group 210, and a second lens group 220. The reflector M1 is disposed in a light path between the object side and the image side. In the embodiment, the reflector M1 is a curved reflector. For example, the reflector M1 is a free form reflective mirror. However, in other embodiments, the reflector M1 may be a plane mirror. The curved reflector M2 is disposed in the light path between the reflector M1 and the image side. In the embodiment, the curved reflector M2 is an aspheric reflector and has a negative refractive power.

Figure 2:
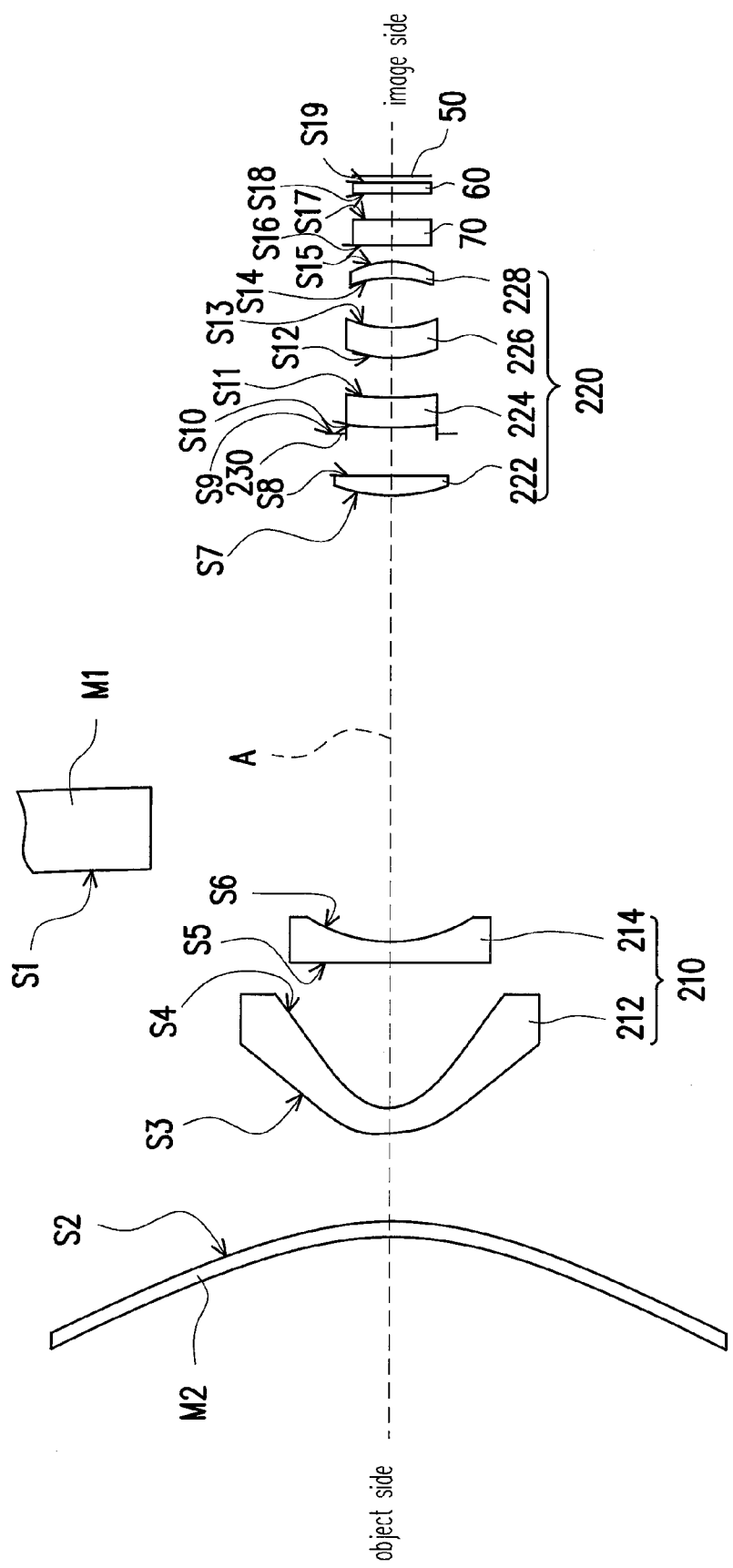
FIG. 2 is a schematic view illustrating the structure of a fixed-focus lens according to an embodiment of the invention.

Referring to FIG. 2, to better describe the invention, FIG. 2 only illuminates a part of the fixed-focus lens 200, i.e., the curved reflector M2, the first lens group 210, and the second lens group 220. The first lens group 210 is disposed in the light path between the curved reflector M2 and an image side and has a negative refractive power. In the embodiment, the first lens group 210 includes a first lens 212 and a second lens 214 arranged in sequence from the object side to the image side, and each of the first lens 212 and the second lens 214, for example, is an aspheric lens. Both of the first lens 212 and the second lens 214, for example, have negative refractive powers. Besides, the first lens 212, for example, is a convex-concave lens with a convex surface facing the object side, and the second lens 214, for example, is a biconcave lens.

The second lens group 220 is disposed in the light path between the first lens group 210 and the image side. In the embodiment, the second lens group 220 having a positive refractive power includes a spherical lens and an aspheric lens, and the aspheric lens is closest to the image side in the second lens group 220. Specifically, the second lens group 220 may include a third lens 222, a fourth lens 224, a fifth lens 226, and a sixth lens 228 arranged in sequence from the object side to the image side. The third lens 222, the fourth lens 224, the fifth lens 226, and the sixth lens 228 all have positive refractive powers. The third lens 222, for example, is a biconvex lens, each of the fourth lens 224 and the fifth lens 226, for example, is a concave-convex lens with a convex surface facing the object side, and the sixth lens 228, for example, is a concave-convex lens with a convex surface facing the image side. In the embodiment, the sixth lens 228 is the aspheric lens closest to the image side in the second lens group 220 and has a positive refractive power, and the fifth lens 226 is another aspheric lens in the second lens group 220.

Generally, a light detector 50 can be disposed at the image side. In the embodiment, the light detector 50, for example, is a charge couple device (CCD) or a complementary metal-oxide-semiconductor sensor (CMOS sensor). Besides, the fixed-focus lens 220 may image an object beam from the object side on the light detector 50. Moreover, the fixed-focus lens 200 further includes an aperture stop 230 disposed in the light path between the third lens 222 and the fourth lens 224. In order to ensure the optical imaging quality, the fixed-focus lens 200 in this embodiment satisfies at least one of the following two conditions:

$$0.04 < f/f_2 < 0.078 \qquad (i)$$

$$0.05 < f/D < 0.18 \qquad (ii)$$

Here, an effective focal length (EFL) of the fixed-focus lens 200 is f, the EFL of the second lens group 220 is $f_2$, and in the second lens group 220, the clear aperture of the aspheric lens (i.e. the sixth lens 228) is D. Besides, in order to make the fixed-focus lens 200 have favorable optical properties, if a distance from the first lens to the second lens is $T_{12}$, and the EFL of the second lens group 220 is $f_2$, the two lens groups 210 and 220 satisfy the following condition: $1.8 < T_{12}/f_2 < 4.5$.

An embodiment of the fixed-focus lens 200 is given hereinafter. However, the invention is not limited to the data listed in Table 1 and Table 2. It is known to those ordinary skilled in the art that various modifications and variations may be made to the structure of the invention without departing from the scope or spirit of the invention.

TABLE 1

| Surface | Curvature Radius (mm) | Distance (mm) | Index of Refraction | Abbe Number | Notes |
|---|---|---|---|---|---|
| S1 | −3200 | −91 | | | Reflector |
| S2 | −61.43 | 33 | | | Curved Reflector |
| S3 | 11.68 | 4 | 1.53 | 55.95 | First Lens |
| S4 | 6.2 | 21.55 | | | |
| S5 | −82.4 | 3 | 1.53 | 55.95 | Second Lens |
| S6 | 32.31 | 77.41 | | | |
| S7 | 25.58 | 2 | 1.49 | 70.24 | Third Lens |
| S8 | −2918.85 | 6.14 | | | |
| S9 | infinity | 0.1 | | | Aperture Stop |
| S10 | 15.22 | 3.57 | 1.49 | 70.24 | Fourth Lens |
| S11 | 27.42 | 5.27 | | | |
| S12 | 12.4 | 3.71 | 1.53 | 55.95 | Fifth Lens |
| S13 | 15.64 | 5.81 | | | |
| S14 | −12.05 | 2.05 | 1.53 | 55.95 | Sixth Lens |
| S15 | −7.09 | 1.88 | | | |
| S16 | infinity | 3.05 | 1.52 | 64.17 | Filter |
| S17 | infinity | 4 | | | |
| S18 | infinity | 0.65 | 1.52 | 64.17 | Cover Glass |
| S19 | infinity | 0.38 | | | |

In Table 1, the distance refers to a linear distance along an optical axis A between two neighboring surfaces. For example, the distance of the surface S3 is the linear distance along the optical axis A between the surface S3 and the surface S4. The corresponding thickness, refractive index, and Abbe number of each lens in the Notes column refer to the numeral value of each distance, refractive index, and Abbe number in the same row. Moreover, in Table 1, the surfaces S1 and S2 are respectively two reflecting surfaces of the reflector M1 and the curved reflector M2, the surfaces S3 and S4 are two surfaces of the first lens 212, the surfaces S5 and S6 are two surfaces of the second lens 214, the surfaces S7 and S8 are two surfaces of the third lens 222, the surface S9 is the aperture stop 230, the surfaces S10 and S11 are two surfaces of the fourth lens 224, the surfaces S12 and S13 are two surfaces of the fifth lens 226, and the surfaces S14 and S15 are two surfaces of the sixth lens 228. The surfaces S16 and S17 are two surfaces of the filter 70, and the surfaces S18 and S19 are two surfaces of the cover glass 60 used in the light detector 50, wherein the distance listed in the row of the surface S19 is the distance from surface S19 to the light detector 50.

The numeral values of the parameters such as the radius of curvature and the distance are given in Table 1 and may not be repeated herein again.

The above surfaces S2-S6 and S12-S15 are aspheric surfaces with even power and are expressed by the following formula:

$$Z = \frac{cr^2}{1 + \sqrt{1 - (1+k)c^2 r^2}} + A_2 r^2 + A_4 r^4 + A_6 r^6 + A_8 r^8 + A_{10} r^{10} + A_{12} r^{12} + \ldots$$

In the formula, Z is a sag in the direction of the optical axis A, and c is the inverse of the radius of an osculating sphere, i.e., the inverse of the radius of curvature (e.g., the radius of curvatures of the surfaces S2-S6 and S12-S15 in the Table 1) close to the optical axis A. k is a conic coefficient, r is an aspheric height, i.e. the height from the center to the edge of the lens, and $A_2$, $A_4$, $A_6$, $A_8$, $A_{10}$, $A_{12}$, . . . are aspheric coefficients. The coefficient $A_2$ is 0 in this embodiment. The parameter values of the surfaces S2-S6 and S12-S15 are listed in Table 2.

200 may arrive at about 163.34 degrees. In the embodiment, the effective focal length (EFL) f of the fixed-focus lens 200 is 1.33 millimeter, and the numerical aperture (F/#) of the fixed-focus lens 200 is 2.4. Besides, $f/f_2$ of the fixed-focus lens 200 is 0.0581, f/D thereof is 0.150, and $T_{12}/f_2$ thereof is 3.378, so that they respectively satisfy the conditions: $0.04 < f/f_2 < 0.078$, $0.05 < f/D < 0.18$ and $1.8 < T_{12}/f_2 < 4.5$. As a result, the fixed-focus lens 200 satisfying the above-described conditions ensures the optical imaging quality of the fixed-focus lens 200 and has good optical properties. Moreover, in the fixed-focus lens 200, the reflector M1 and the curved reflector M2 used together with the first lens group 210 and the second lens group 220 may further reduce image aberration of optical imaging. Therefore, the fixed-focus lens 200 has the advantages of a large FOV, small image aberration, and a low distortion degree. Furthermore, the fixed-focus lens 200 uses less reflectors, so that not only the cost of the products is reduced, but also the trouble of aligning the optical axis of the optical system is removed.

Figure 4:
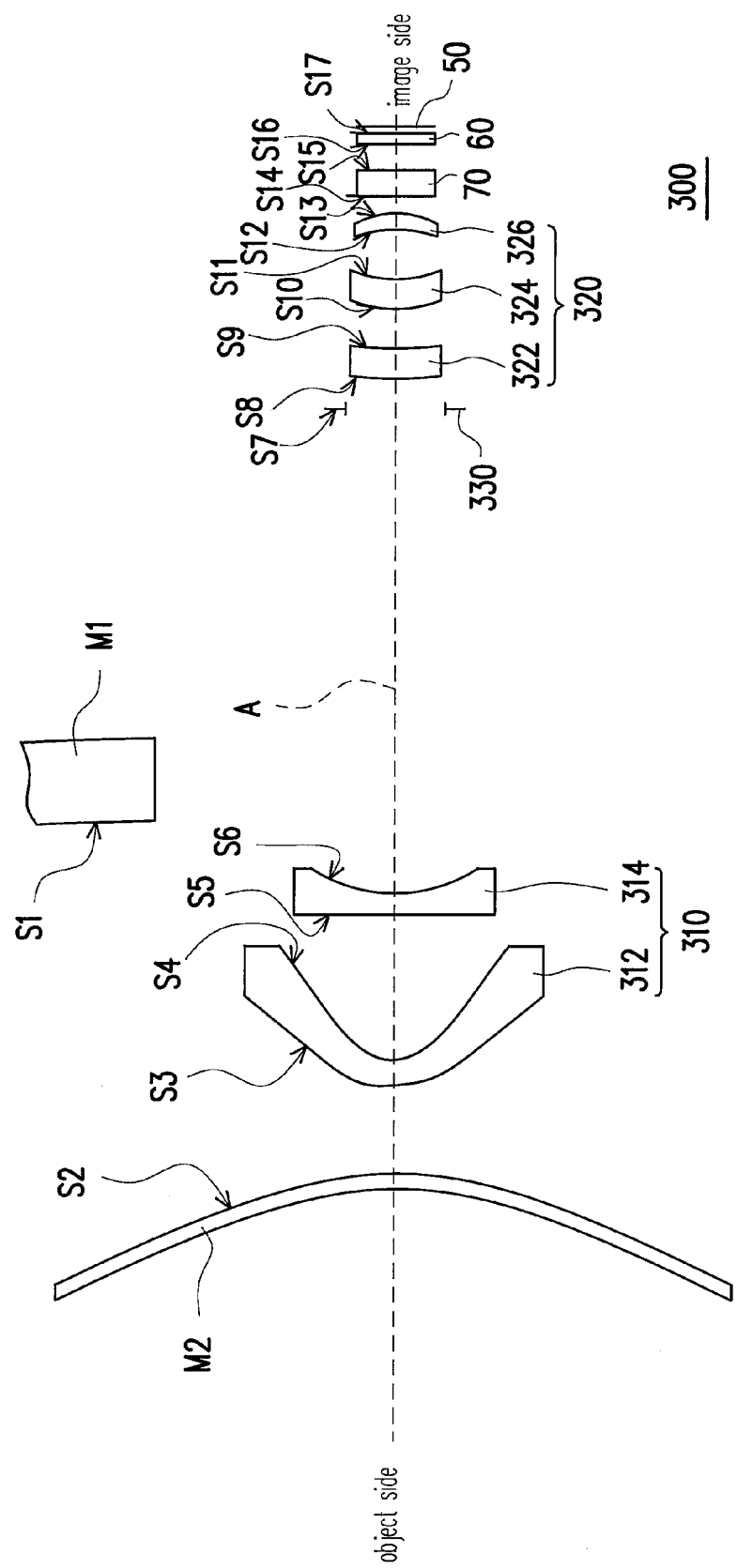
FIG. 4 is a schematic view illustrating the structure of a fixed-focus lens according to another embodiment of the invention.

Referring to FIG. 4, the design concept of the fixed-focus lens 300 of the embodiment is similar to the design concept of the fixed-focus lens 200 (as shown in FIG. 2), and the difference between the two fixed-focus lenses 300 and 200 is described as follows.

In the fixed-focus lens 300 of the embodiment, the second lens group 320 is disposed in the light path between the first lens group 310 and the image side and has a positive refractive power. In the embodiment, the second lens group 320 includes a third lens 322, a fourth lens 324, and a fifth lens 326 arranged in sequence from the object side to the image side. Refractive powers of the third lens 322, the fourth lens 324,

TABLE 2

| Aspheric Parameter | Conic Coefficient k | Coefficient $A_4$ | Coefficient $A_6$ | Coefficient $A_8$ | Coefficient $A_{10}$ | |
|---|---|---|---|---|---|---|
| S2 | −4.403386 | 1.264429E−07 | −3.131938E−11 | 3.553023E−15 | −1.587649E−19 | |
| S3 | −0.8266703 | −5.431251E−05 | 9.955908E−09 | 5.070896E−11 | −9.173795E−14 | |
| S4 | −0.9800202 | −8.404781E−05 | −1.554821E−07 | 8.985873E−10 | −1.216279E−12 | |
| S5 | −18.8795 | 1.465830E−05 | 3.511389E−08 | −1.869898E−10 | 1.866265E−13 | |
| S6 | 2.925407 | 4.237509E−05 | −2.125259E−08 | 5.948166E−11 | −1.712266E−12 | |

| Aspheric Parameter | Conic Coefficient k | Coefficient $A_4$ | Coefficient $A_6$ | Coefficient $A_8$ | Coefficient $A_{10}$ | Coefficient $A_{12}$ |
|---|---|---|---|---|---|---|
| S12 | 2.661173 | −1.541220E−04 | −4.053848E−06 | −5.138022E−08 | −1.470537E−10 | −2.600715E−11 |
| S13 | 1.772705 | 1.151943E−04 | −4.694237E−06 | 3.840114E−08 | −7.434969E−09 | 2.578942E−10 |
| S14 | −7.527678 | −3.058510E−04 | 1.424985E−05 | −7.006138E−07 | 1.523757E−08 | −2.913450E−11 |
| S15 | −2.19048 | 1.411556E−04 | 4.524255E−06 | −3.502199E−07 | 1.142999E−08 | −1.167783E−10 |

Figure 3A:
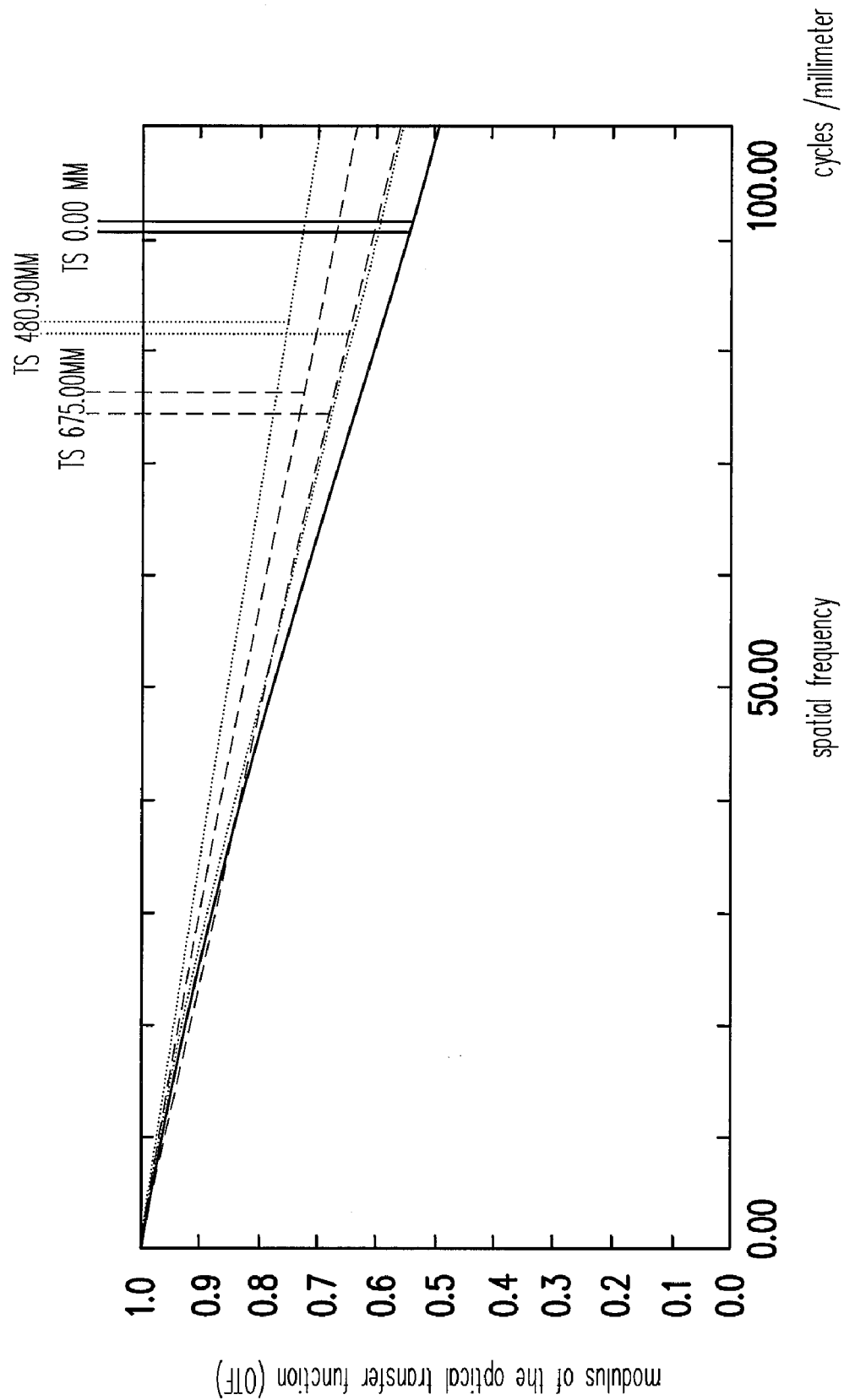
FIGS. 3A and 3B are diagrams showing the optical imaging simulation data of the fixed-focus lens in FIG. 2.
Figure 3B:
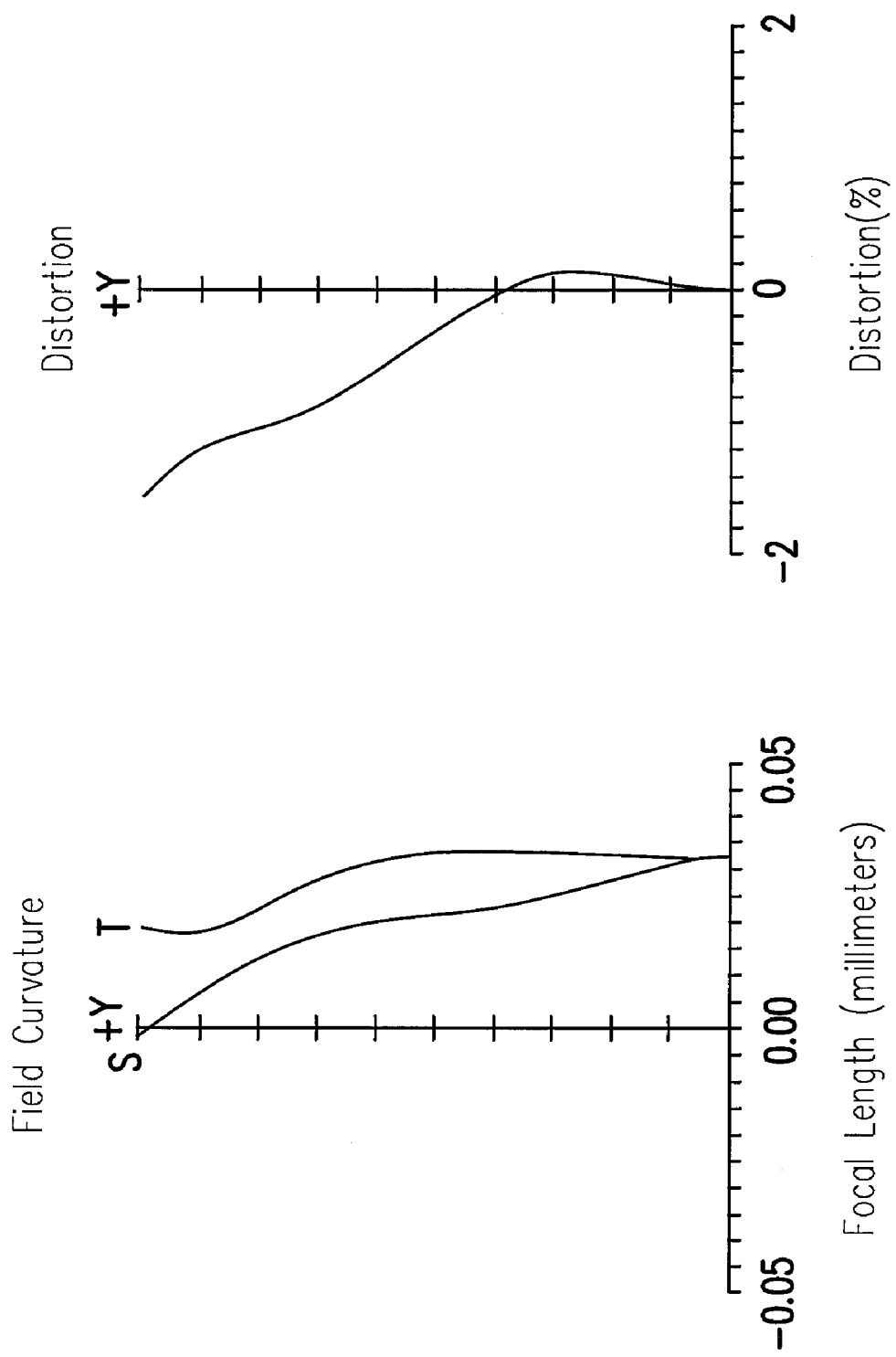

Referring to FIGS. 3A and 3B, FIG. 3A is a modulation transfer function (MTF) graph, and in the MTF graph, the transverse axis indicates a spatial frequency in cycles per millimeter, and the longitudinal axis indicates a modulus of the optical transfer function (OTF). FIG. 3A is a simulation data diagram obtained with a light having a wavelength of 850 nm. Moreover, FIG. 3B shows graphics of a field curvature and a distortion respectively from left to right and is simulated with a light having a wavelength of 850 nm. Since the graphics shown in both FIGS. 3A and 3B fall within a standard range, the fixed-focus lens 200 of this embodiment maintains a good imaging quality while having a large FOV.

The fixed-focus lens 200 of the embodiment, for example, is applied to a touch screen. In practice, the reflector M1 and the curved reflector M2 are mainly used to reflect the beams refracted through the first lens group 210 and the second lens group 220 and, with the first lens group 210 and the second lens group 220, the maximum FOV of the fixed-focus lens and the fifth lens 326, for example, are sequentially positive, positive, and positive. The third lens 322, for example, is a concave-convex lens with a convex surface facing the object side, the fourth lens 324, for example, is a convex-concave lens with a convex surface facing the object side, and the fifth lens 326, for example, is a concave-convex lens with a convex surface facing the image side. In the embodiment, the fifth lens 326 is the aspheric lens closest to the image side in the second lens group 320 and has a positive refractive power, and the fourth lens 324 is another aspheric lens in the second lens group 320.

An embodiment of the fixed-focus lens 300 is given hereinafter. However, the invention is not limited to the data listed in Table 3 and Table 4. It is known to those ordinary skilled in the art that various modifications and variations may be made to the structure of the invention without departing from the scope or spirit of the invention.

TABLE 3

| Surface | Curvature Radius (mm) | Distance (mm) | Index of Refraction | Abbe Number | Notes |
|---|---|---|---|---|---|
| S1 | −3200 | −91 | | | Reflector |
| S2 | −61.43 | 33 | | | Curved Reflector |
| S3 | 11.68 | 4 | 1.53 | 55.95 | First Lens |
| S4 | 6.20 | 21.55 | | | |
| S5 | −82.40 | 3 | 1.53 | 55.95 | Second Lens |
| S6 | 32.31 | 76.39 | | | |
| S7 | infinity | 0.10 | | | Aperture Stop |
| S8 | 14.17 | 3.92 | 1.52 | 64.14 | Third Lens |
| S9 | 224 | 5.82 | | | |
| S10 | 7.79 | 3.66 | 1.53 | 55.95 | Fourth Lens |
| S11 | 6.75 | 7.17 | | | |
| S12 | −157.32 | 1.70 | 1.52 | 64.07 | Fifth Lens |
| S13 | −13.15 | 1.71 | | | |
| S14 | infinity | 3.05 | 1.52 | 64.17 | Filter |
| S15 | infinity | 4 | | | |
| S16 | infinity | 0.65 | 1.52 | 64.17 | Cover Glass |
| S17 | infinity | 0.42 | | | |

The above surfaces S2-S6 and S10-S13 are aspheric surfaces with even power and are expressed by the following formula:

$$Z = \frac{cr^2}{1+\sqrt{1-(1+k)c^2 r^2}} + A_2 r^2 + A_4 r^4 + A_6 r^6 + A_8 r^8 + A_{10} r^{10} + A_{12} r^{12} + \ldots$$

In the formula, Z is a sag in the direction of the optical axis A, and c is the inverse of the radius of an osculating sphere, i.e., the inverse of the radius of curvature (e.g., the radius of curvatures of the surfaces S2-S6 and S10-S13 in the Table 3) close to the optical axis A. k is a conic coefficient, r is an aspheric height, i.e. the height from the center to the edge of the lens, and $A_2$, $A_4$, $A_6$, $A_8$, $A_{10}$, $A_{12}$, . . . are aspheric coefficients. The coefficient $A_2$ is 0 in this embodiment. The parameter values of the surfaces S2-S6 and S10-S13 are listed in Table 4.

TABLE 4

| Aspheric Parameter | Conic Coefficient k | Coefficient $A_4$ | Coefficient $A_6$ | Coefficient $A_8$ | Coefficient $A_{10}$ |
|---|---|---|---|---|---|
| S2 | −4.403386 | 1.264429E−07 | −3.131938E−11 | 3.553023E−15 | −1.587649E−19 |
| S3 | −0.8266703 | −5.431251E−05 | 9.955908E−09 | 5.070896E−11 | −9.173795E−14 |
| S4 | −0.9800202 | −8.404781E−05 | −1.554821E−07 | 8.985873E−10 | −1.216279E−12 |
| S5 | −18.8795 | 1.465830E−05 | 3.511389E−08 | −1.869898E−10 | 1.866265E−13 |
| S6 | 2.925407 | 4.237509E−05 | −2.125259E−08 | 5.948166E−11 | −1.712266E−12 |

| Aspheric Parameter | Conic Coefficient k | Coefficient $A_4$ | Coefficient $A_6$ | Coefficient $A_8$ | Coefficient $A_{10}$ | Coefficient $A_{12}$ |
|---|---|---|---|---|---|---|
| S10 | −0.0232104 | −3.461242E−05 | −2.226436E−06 | −1.392788E−07 | 1.419829E−09 | 2.622948E−12 |
| S11 | −0.1861637 | 3.140394E−04 | −1.135129E−06 | −6.786844E−07 | 9.810714E−09 | 1.863913E−10 |
| S12 | 811.3033 | 2.626860E−04 | −1.172938E−05 | −4.864103E−07 | −1.877581E−08 | 2.375017E−10 |
| S13 | −7.455108 | 6.161984E−05 | −6.120696E−06 | −6.904995E−07 | −7.359020E−09 | 2.057808E−10 |

In Table 3, the distance refers to a linear distance along an optical axis A between two neighboring surfaces. For example, the distance of the surface S3 is the linear distance along the optical axis A between the surface S3 and the surface S4. The corresponding thickness, refractive index, and Abbe number of each lens in the Notes column refer to the numeral value of each distance, refractive index, and Abbe number in the same row. Moreover, in Table 3, the surfaces S1 and S2 are respectively two reflecting surfaces of the reflector M1 and the curved reflector M2, the surfaces S3 and S4 are two surfaces of the first lens 312, the surfaces S5 and S6 are two surfaces of the second lens 314, the surface S7 is the aperture stop 330, the surfaces S8 and S9 are two surfaces of the third lens 322, the surfaces S10 and S11 are two surfaces of the fourth lens 324, and the surfaces S12 and S13 are two surfaces of the fifth lens 326. The surfaces S14 and S15 are two surfaces of the filter 70, and the surfaces S16 and S17 are two surfaces of the cover glass 60 used in the light detector 50, wherein the distance listed in the row of the surface S17 is the distance from the surface S17 to the light detector 50.

The numeral values of the parameters such as the radius of curvature and the distance of each surface are given in Table 3 and may not be repeated herein again.

Figure 5A:
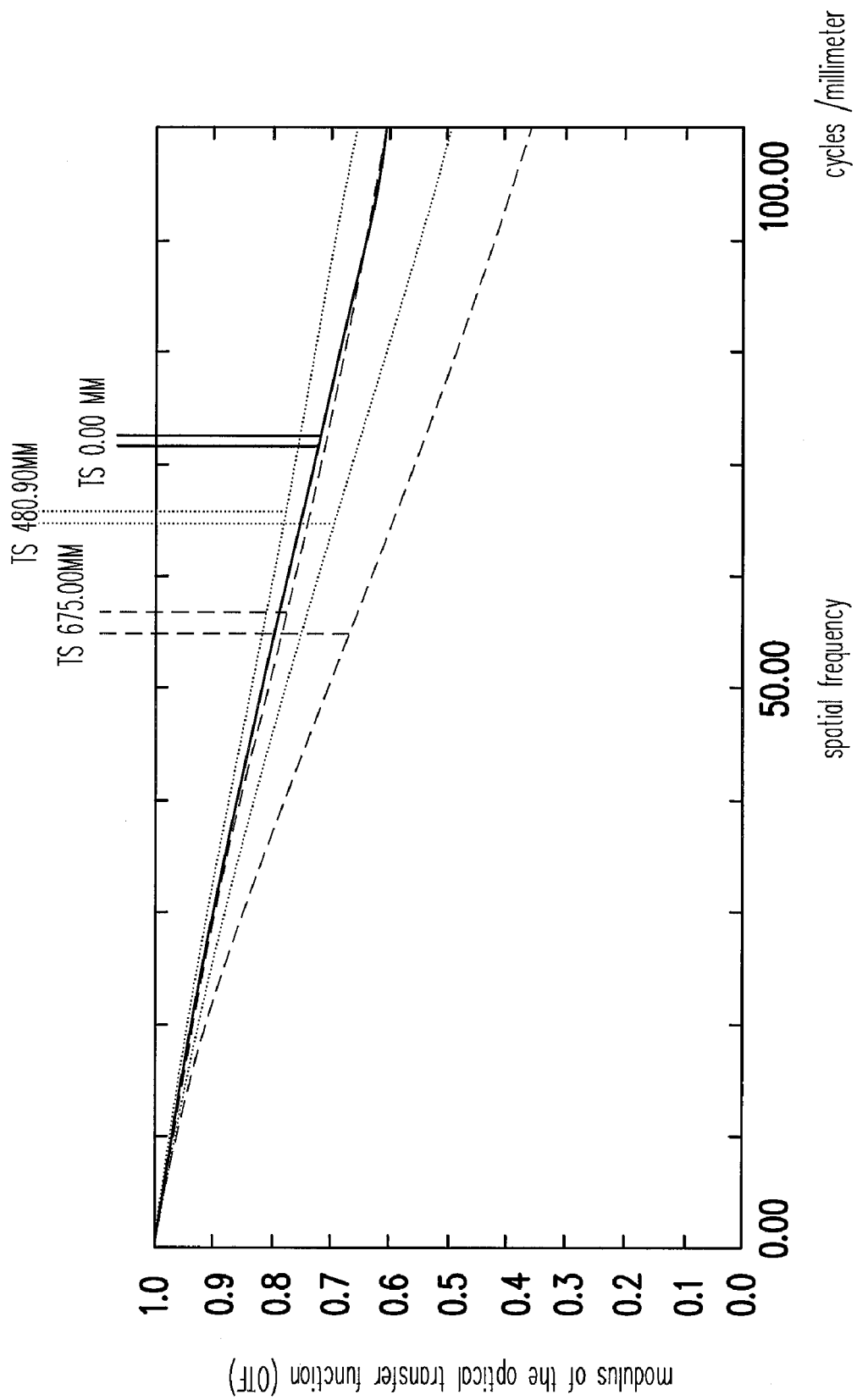
FIGS. 5A and 5B are diagrams showing the optical imaging simulation data of the fixed-focus lens in FIG. 4.
Figure 5B:
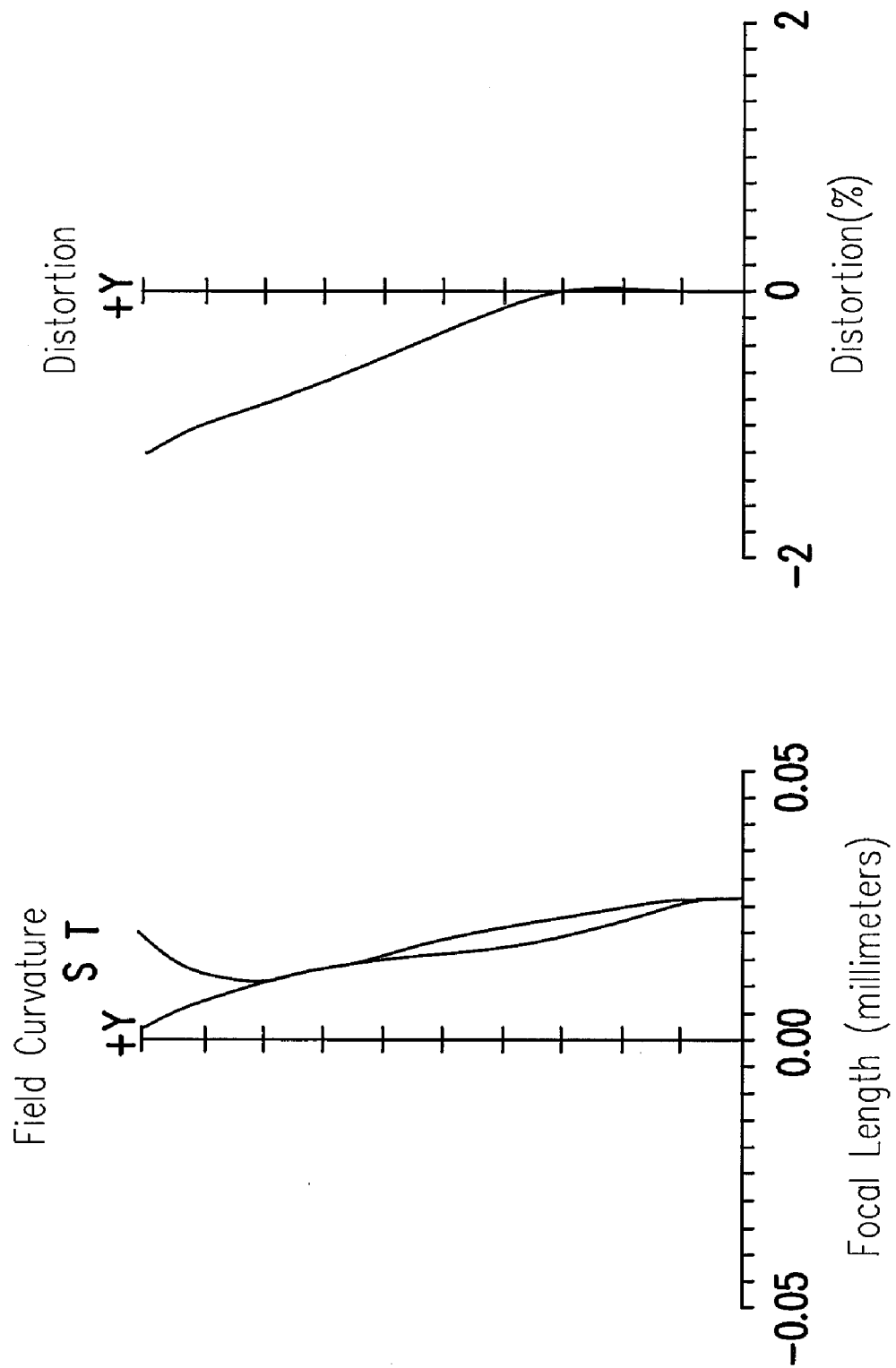

Referring to FIGS. 5A and 5B, FIG. 5A is a modulation transfer function (MTF) graph, and in the MTF graph, the transverse axis indicates a spatial frequency in cycles per millimeter, and the longitudinal axis indicates a modulus of the optical transfer function (OTF). FIG. 5A is a simulation data diagram obtained with light having wavelengths ranging from 835 nm to 865 nm. Moreover, FIG. 5B shows graphics of a field curvature and a distortion respectively from left to right and is simulated with a light having a wavelength of 850 nm. Since both the graphics shown in FIGS. 5A and 5B fall within a standard range, the fixed-focus lens 300 of this embodiment maintains a good imaging quality while having a large FOV.

Similarly, if the distance from the first lens group 310 to the second lens group 320 is $T_{12}$, and the EFL of the second lens group 320 is $f_2$, the two lens groups 310 and 320 satisfy the following condition: $1.8 < T_{12}/f_2 < 4.5$. In the embodiment, $T_{12}/f_2$ is 3.625, thus satisfying the above-described condition. Besides, with use of the reflector M1 and the curved reflector M2 together with the first lens group 310 and the second lens group 320, the maximum FOV of the fixed-focus lens 300 may arrive at about 163.38 degrees. The EFL f of the fixed-focus lens 300 is 1.30 millimeter, and the numerical aperture (F/#) of the fixed-focus lens 300 is 2.4. In the embodiment, $f/f_2$ is 0.0619 and f/D is 0.1449, so that the conditions, i.e., 0.04<$f/f_2$<0.078 and 0.05<$f/D$<0.18, are respectively satisfied. Besides, the fixed-focus lens 300 further includes an aperture stop 330 disposed in the light path between the second lens 314 and the third lens 322.

Figure 6:
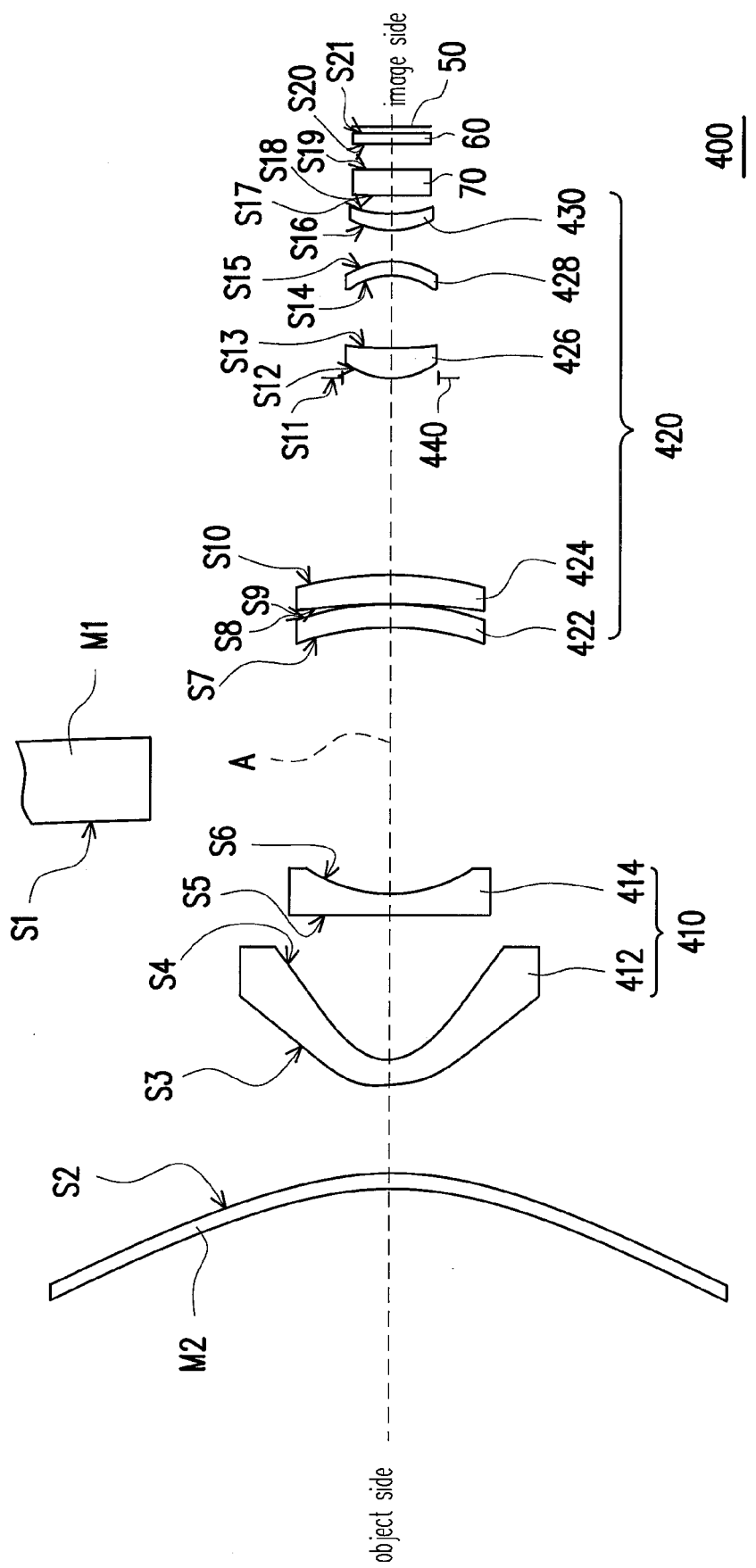
FIG. 6 is a schematic view illustrating the structure of a fixed-focus lens according to another embodiment of the invention.

Referring to FIG. 6, the design concept of the fixed-focus lens 400 is similar to the design concept of the fixed-focus lens 200 (as shown in FIG. 2), and the difference between the two fixed-focus lenses 400 and 200 is described as follows.

In the fixed-focus lens 400 of the embodiment, the second lens group 420 is disposed in the light path between the first lens group 410 and the image side and has a positive refractive power.

In the embodiment, the second lens group 420 includes a third lens 422, a fourth lens 424, a fifth lens 426, a sixth lens 428, and a seventh lens 430 arranged in sequence from the object side to the image side.

Refractive powers of the third lens 422, the fourth lens 424, the fifth lens 426, the sixth lens 428, and the seventh lens 430 are sequentially positive, positive, positive, negative, and positive. Each of the third lens 422 and the fourth lens 424, for example, is a concave-convex lens with a convex surface facing the image side, each of the fifth lens 426 and the seventh lens 430, for example, is a concave-convex lens with a convex surface facing the object side, and the sixth lens 428 is a convex-concave lens with a convex surface facing the image side. In the embodiment, the seventh lens 430 is the aspheric lens closest to the image side in the second lens group 420 and has a positive refractive power, and the fifth lens 426 is another aspheric lens in the second lens group 420.

An embodiment of the fixed-focus lens 400 is given hereinafter. However, the invention is not limited to the data listed in Table 5 and Table 6. It is known to those ordinary skilled in the art that various modifications and variations may be made to the structure of the invention without departing from the scope or spirit of the invention.

TABLE 5

| Surface | Curvature Radius (mm) | Distance (mm) | Index of refraction | Abbe Number | Notes |
|---|---|---|---|---|---|
| S1 | −3200 | −91 | | | Reflector |
| S2 | −61.43 | 33 | | | Curved Reflector |
| S3 | 11.68 | 4 | 1.53 | 55.95 | First Lens |
| S4 | 6.20 | 21.55 | | | |
| S5 | −82.40 | 3 | 1.53 | 55.95 | Second Lens |
| S6 | 32.31 | 46.47 | | | |
| S7 | −80.39 | 2.44 | 1.49 | 70.24 | Third Lens |
| S8 | −48.53 | 0.15 | | | |
| S9 | −103.29 | 2.88 | 1.53 | 48.84 | Fourth Lens |
| S10 | −44.27 | 26.87 | | | |
| S11 | infinity | 0.10 | | | Aperture Stop |
| S12 | 6.88 | 2.58 | 1.53 | 59.95 | Fifth Lens |
| S13 | 20.13 | 6.44 | | | |
| S14 | −5.18 | 1.42 | 1.59 | 61.14 | Sixth Lens |
| S15 | −7.85 | 2.86 | | | |
| S16 | 9.09 | 1.89 | 1.53 | 55.95 | First Lens |

TABLE 5-continued

| Surface | Curvature Radius (mm) | Distance (mm) | Index of refraction | Abbe Number | Notes |
|---|---|---|---|---|---|
| S17 | 36.13 | 1 | | | |
| S18 | infinity | 3.05 | 1.52 | 64.17 | Filter |
| S19 | infinity | 4 | | | |
| S20 | infinity | 0.65 | 1.52 | 64.17 | Cover Glass |
| S21 | infinity | 0.47 | | | |

In Table 5, the distance refers to a linear distance along an optical axis A between two neighboring surfaces. For example, the distance of the surface S3 is the linear distance along the optical axis A between the surface S3 and the surface S4. The corresponding thickness, refractive index, and Abbe number of each lens in the Notes column refer to the numeral value of each distance, refractive index, and Abbe number in the same row. Moreover, in Table 5, the surfaces S1 and S2 are respectively two reflecting surfaces of the reflector M1 and the curved reflector M2, the surfaces S3 and S4 are two surfaces of the first lens 412, the surfaces S5 and S6 are two surfaces of the second lens 414, the surfaces S7 and S8 are two surfaces of the third lens 422, the surfaces S9 and S10 are two surfaces of the fourth lens 424, the surface S11 is the aperture stop 440 surfaces, the surfaces S12 and S13 are two surfaces of the fifth lens 426, the surfaces S14 and S15 are two surfaces of the sixth lens 428, and the surfaces S16 and S17 are two surfaces of the seventh lens 430. The surfaces S18 and S19 are two surfaces of the filter 70, and the surfaces S20 and S21 are two surfaces of the cover glass 60 used in the light detector 50, wherein the distance listed in the row of the surface S21 is the distance from the surface S21 to the light detector 50.

The numeral values of the parameters such as the radius of curvature and the distance of each surface are given in Table 5 and may not be repeated herein again.

The above surfaces S2-S6, S12, S13, S16, and S17 are aspheric surfaces with even power and are expressed by the following formula:

$$Z = \frac{cr^2}{1 + \sqrt{1-(1+k)c^2r^2}} + A_2r^2 + A_4r^4 + A_6r^6 + A_8r^8 + A_{10}r^{10} + A_{12}r^{12} + \ldots$$

In the formula, Z is a sag in the direction of the optical axis A, and c is the inverse of the radius of an osculating sphere, i.e., the inverse of the radius of curvature (e.g., the radius of curvatures of the surfaces S2~S6, S12, S13, S16, and S17 in Table 5) close to the optical axis A. k is a conic coefficient, r is an aspheric height, i.e. the height from the center to the edge of the lens, and $A_2$, $A_4$, $A_6$, $A_8$, $A_{10}$, $A_{12}$, . . . are aspheric coefficients. The coefficient $A_2$ is 0 in this embodiment. The parameter values of the surfaces S2~S6, S12, S13, S16, and S17 are listed in Table 6.

TABLE 6

| Aspheric Parameter | Conic Coefficient k | Coefficient $A_4$ | Coefficient $A_6$ | Coefficient $A_8$ | Coefficient $A_{10}$ |
|---|---|---|---|---|---|
| S2 | −4.403386 | 1.264429E−07 | −3.131938E−11 | 3.553023E−15 | −1.587649E−19 |
| S3 | −0.8266703 | −5.431251E−05 | 9.955908E−09 | 5.070896E−11 | −9.173795E−14 |
| S4 | −0.9800202 | −8.404781E−05 | −1.554821E−07 | 8.985873E−10 | −1.216279E−12 |
| S5 | −18.8795 | 1.465830E−05 | 3.511389E−08 | −1.869898E−10 | 1.866265E−13 |
| S6 | 2.925407 | 4.237509E−05 | −2.125259E−08 | 5.948166E−11 | −1.712266E−12 |
| S12 | −0.0625594 | 2.684693E−05 | −5.186842E−06 | 3.761854E−07 | −1.773328E−08 |

TABLE 6-continued

| Aspheric Parameter | Conic Coefficient k | Coefficient $A_4$ | Coefficient $A_6$ | Coefficient $A_8$ | Coefficient $A_{10}$ |
|---|---|---|---|---|---|
| S13 | −4.4035034 | 9.264871E−05 | −2.622555E−06 | −9.253088E−08 | −1.292595E−08 |
| S16 | 0.09584951 | 6.899248E−04 | −5.098230E−05 | 3.024524E−06 | −1.370027E−07 |
| S17 | 62.8496642 | 1.259596E−03 | −5.459677E−05 | 2.654629E−06 | −1.665864E−07 |

Figure 7A:
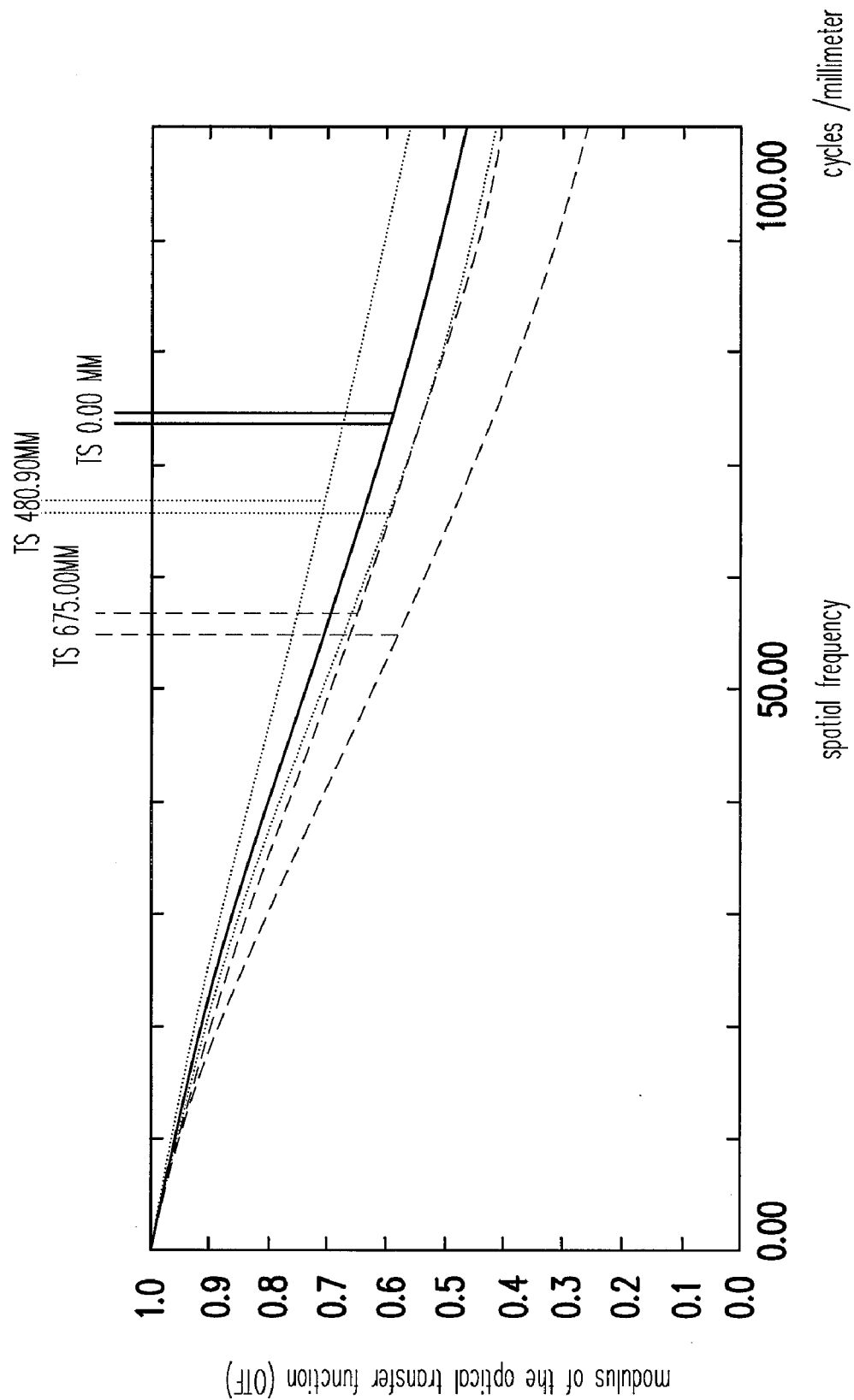
FIGS. 7A and 7B are diagrams showing the optical imaging simulation data of the fixed-focus lens in FIG. 6.
Figure 7B:
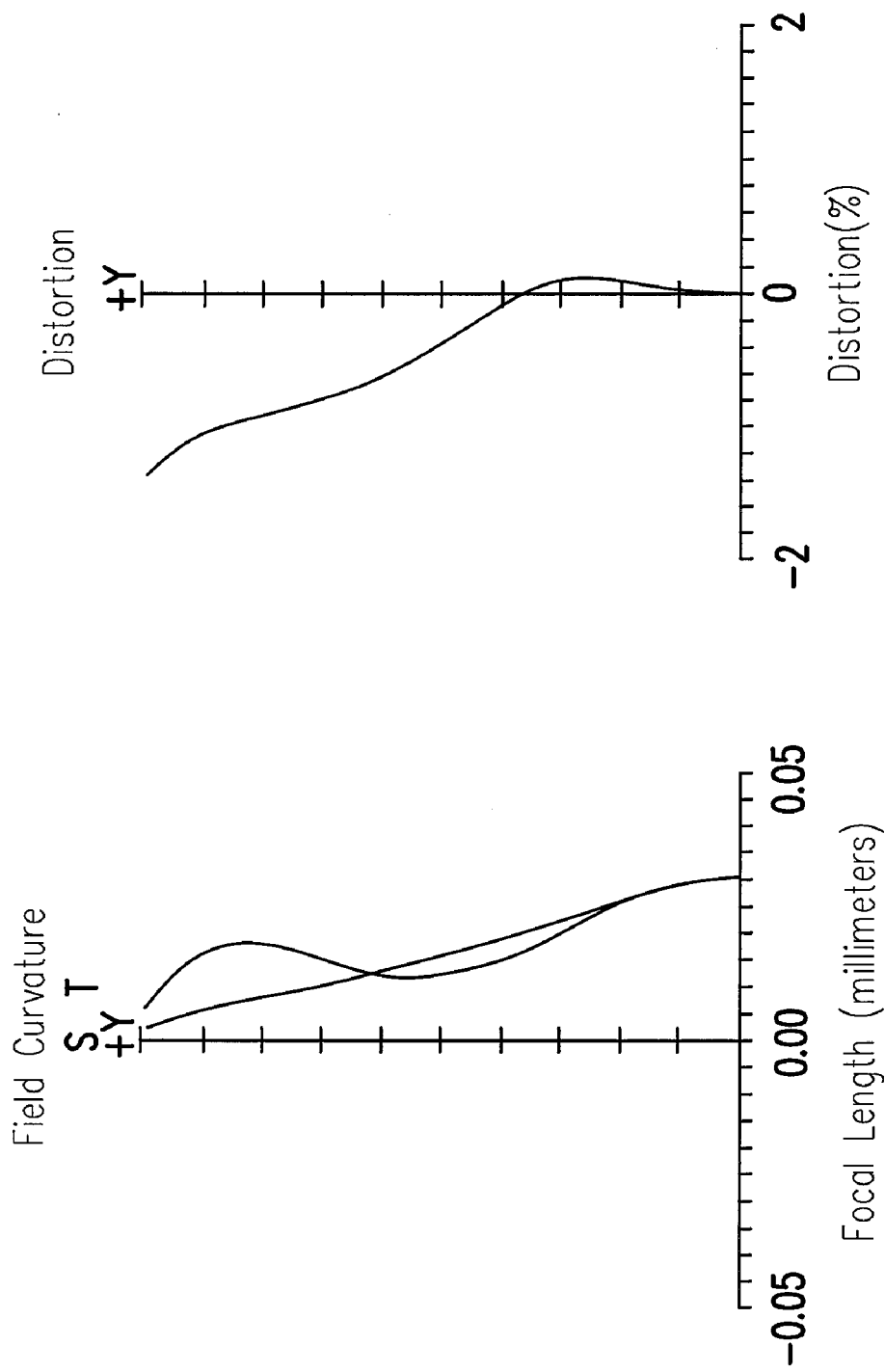

Referring to FIGS. 7A and 7B, FIG. 7A is a modulation transfer function (MTF) graph, and in the MTF graph the transverse axis indicates a spatial frequency in cycles per millimeter, and the longitudinal axis indicates a modulus of the optical transfer function (OTF). FIG. 7A is a simulation data diagram obtained with light having wavelengths ranging from 830 nm to 870 nm. Moreover, FIG. 7B shows graphics of a field curvature and a distortion respectively from left to right and is simulated with a light having a wavelength of 850 nm. Since both the graphics shown in FIGS. 7A and 7B fall within a standard range, the fixed-focus lens 400 of this embodiment maintains a good imaging quality while having a large FOV.

Similarly, if the distance from the first lens group 410 to the second lens group 420 is $T_{12}$, and the EFL of the second lens group 420 is $f_2$, the two lens groups 410 and 420 satisfy the following condition: $1.8 < T_{12}/f_2 < 4.5$. In the embodiment, $T_{12}/f_2$ is 2.097, thus satisfying the above-described condition. Besides, with use of the reflector M1 and the curved reflector M2 together with the first lens group 410 and the second lens group 420, the maximum FOV of the fixed-focus lens 400 may arrive at about 164.5 degrees. The EFL f of the fixed-focus lens 400 is 1.36 millimeter, and the numerical aperture (F/#) of the fixed-focus lens 400 is 2.4. In the embodiment, $f/f_2$ is 0.06148 and f/D is 0.1586, so that the conditions, i.e., $0.04 < f/f_2 < 0.078$ and $0.05 < f/D < 0.18$, are respectively satisfied. Besides, the fixed-focus lens 400 further includes an aperture stop 440 disposed in the light path between the fourth lens 424 and the fifth lens 426.

Figure 8:
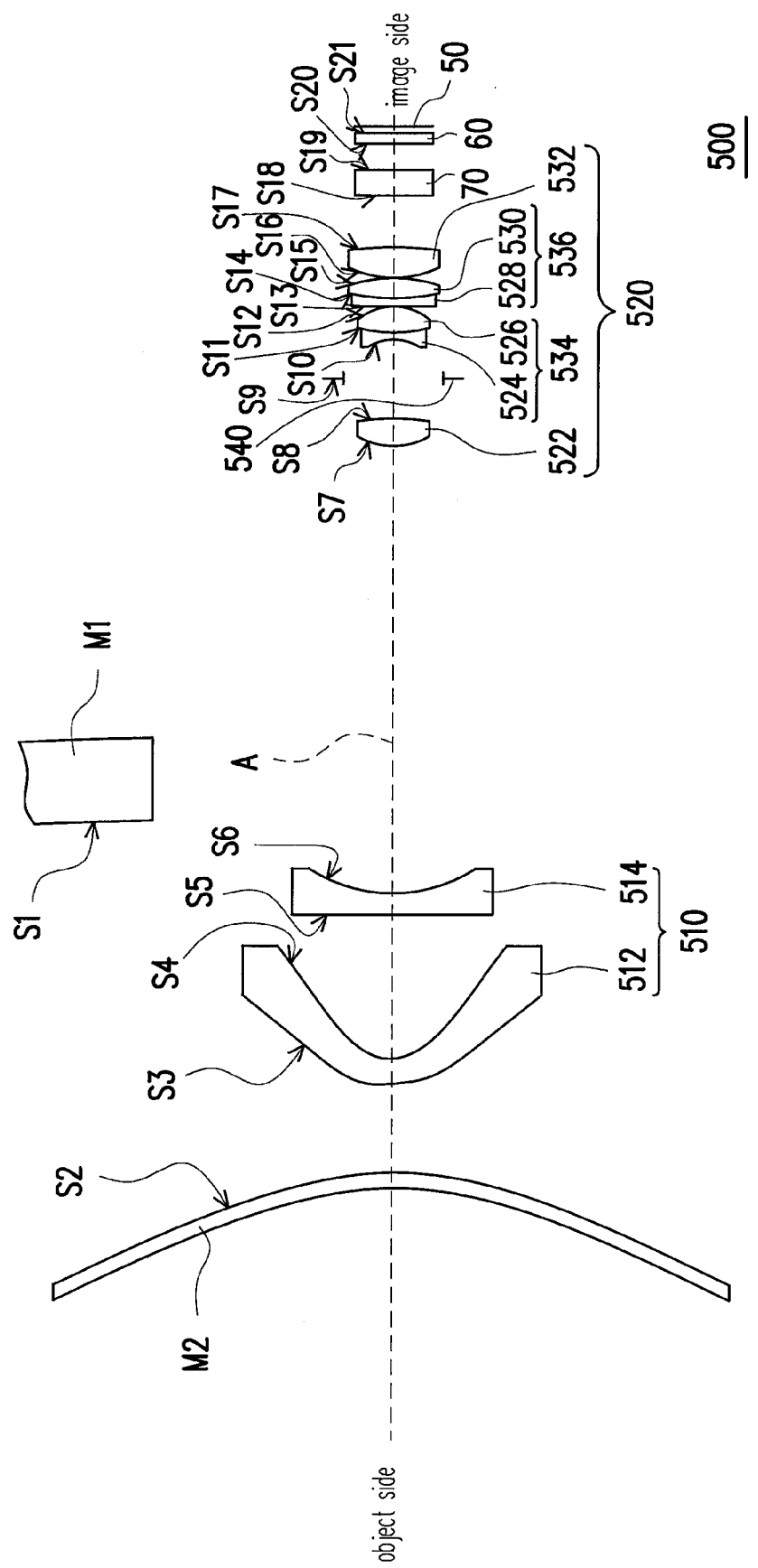
FIG. 8 is a schematic view illustrating the structure of a fixed-focus lens according to another embodiment of the invention.

Referring to FIG. 8, the design concept of the fixed-focus lens 500 is similar to the design concept of the fixed-focus lens 200 (as shown in FIG. 2), and the difference between the two fixed-focus lenses 500 and 200 is described as follows.

In the fixed-focus lens 500 of the embodiment, the second lens group 520 is disposed in the light path between the first lens group 510 and the image side, and has a positive refractive power. The second lens group 520 includes a spherical lens and an aspheric lens, and the aspheric lens is closest to the image side in the second lens group 520. Specifically, in the embodiment, the second lens group 520 includes a third lens 522, a fourth lens 524, a fifth lens 526, a sixth lens 528, a seventh lens 530, and an eighth lens 532 arranged in sequence from the object side to the image side. Refractive powers of the third lens 522, the fourth lens 524, the fifth lens 526, the sixth lens 528, the seventh lens 530, and the eighth lens 532 are sequentially positive, negative, positive, negative, positive, and positive. Each of the third lens 522, the fifth lens 526, the seventh lens 530, and the eighth lens 532, for example, is a biconvex lens. The fourth lens 524, for example, is a biconcave lens. The sixth lens 528, for example, is a convex-concave lens with a convex surface facing the object side. Here, the fourth lens 524 and the fifth lens 526 together form a first double cemented lens 534, and the sixth lens 528 and the seventh lens 530 together form a second double cemented lens 536. In the embodiment, the eighth lens 532 is the aspheric lens closest to the image side in the second lens group 520 and has a positive refractive power.

An embodiment of the fixed-focus lens 500 is given hereinafter. However, the invention is not limited to the data listed in Table 7 and Table 8. It is known to those ordinary skilled in the art that various modifications and variations may be made to the structure of the present invention without departing from the scope or spirit of the invention.

TABLE 7

| Surface | Curvature Radius (mm) | Distance (mm) | Index of refraction | Abbe Number | Notes |
|---|---|---|---|---|---|
| S1 | −3200 | −91 | | | Reflector |
| S2 | −61.68 | 33 | | | Curved Reflector |
| S3 | 12.27 | 4 | 1.49 | 57.44 | First Lens |
| S4 | 6.28 | 21.55 | | | |
| S5 | −100.91 | 3 | 1.49 | 57.44 | Second Lens |
| S6 | 27.55 | 67.2 | | | |
| S7 | 21.68 | 4.14 | 1.59 | 35.31 | Third Lens |
| S8 | −57.49 | 5.12 | | | |
| S9 | infinity | 6.95 | | | Aperture Stop |
| S10 | −7.14 | 1.97 | 1.81 | 25.43 | First Double Cemented Lens |
| S11 | 54.73 | 4.41 | 1.49 | 70.24 | |
| S12 | −7.83 | 0.15 | | | |
| S13 | 203.39 | 2.05 | 1.83 | 37.16 | Second Double Cemented Lens |
| S14 | 27.74 | 3.23 | 1.49 | 70.24 | |
| S15 | −27.74 | 0.14 | | | |
| S16 | 16.51 | 5.3 | 1.49 | 57.44 | Eighth Lens |
| S17 | −34.20 | 4 | | | |
| S18 | infinity | 3.05 | 1.52 | 64.17 | Filter |
| S19 | infinity | 9.01 | | | |
| S20 | infinity | 0.65 | 1.52 | 64.17 | Cover Glass |
| S21 | infinity | 0.44 | | | |

In Table 7, the distance refers to a linear distance along an optical axis A between two neighboring surfaces. For example, the distance of the surface S3 is the linear distance along the optical axis A between the surface S3 and the surface S4. The corresponding thickness, refractive index, and Abbe number of each lens in the Notes column refer to the numeral value of each distance, refractive index, and Abbe number in the same row. Moreover, in Table 7, the surfaces S1 and S2 are respectively two reflecting surfaces of the reflector M1 and the curved reflector M2, the surfaces S3 and S4 are two surfaces of the first lens 512, the surfaces S5 and S6 are two surfaces of the second lens 514, the surfaces S7 and S8 are two surfaces of the third lens 522, the surface S9 is the aperture stop 540, the surfaces S10 and S12 are two surfaces of the first double cemented lens 534, the surfaces S13 and S15 are two surfaces of the second double cemented lens 536, and the surfaces S16 and S17 are two surfaces of the eighth lens 532. The surfaces S18 and S19 are two surfaces of the filter 70, and the surfaces S20 and S21 are two surfaces of the cover glass 60 used in the light detector 50, wherein the distance listed in the row of the surface S21 is the distance from the surface S21 to the light detector 50.

The numeral values of the parameters such as the radius of curvature and the distance of each surface are given in Table 7 and may not be repeated herein again.

The above surfaces S2-S6, S18, and S19 are aspheric surfaces with even power and are expressed by the following formula:

$$Z = \frac{cr^2}{1+\sqrt{1-(1+k)c^2r^2}} + A_2r^2 + A_4r^4 + A_6r^6 + A_8r^8 + A_{10}r^{10} + A_{12}r^{12} + \ldots$$

In the formula, Z is a sag in the direction of the optical axis A, and c is the inverse of the radius of an osculating sphere, i.e., the inverse of the radius of curvature (e.g., the radius of curvatures of the surfaces S2~S6, S18, and S19 in Table 7) close to the optical axis A. k is a conic coefficient, r is an aspheric height, i.e., the height from the center to the edge of the lens, and $A_2$, $A_4$, $A_6$, $A_8$, $A_{10}$, $A_{12}$, . . . are aspheric coefficients. The coefficient $A_2$ is 0 in this embodiment. The parameter values of the surfaces S2~S6, S18, and S19 are listed in Table 8.

Figure 10:
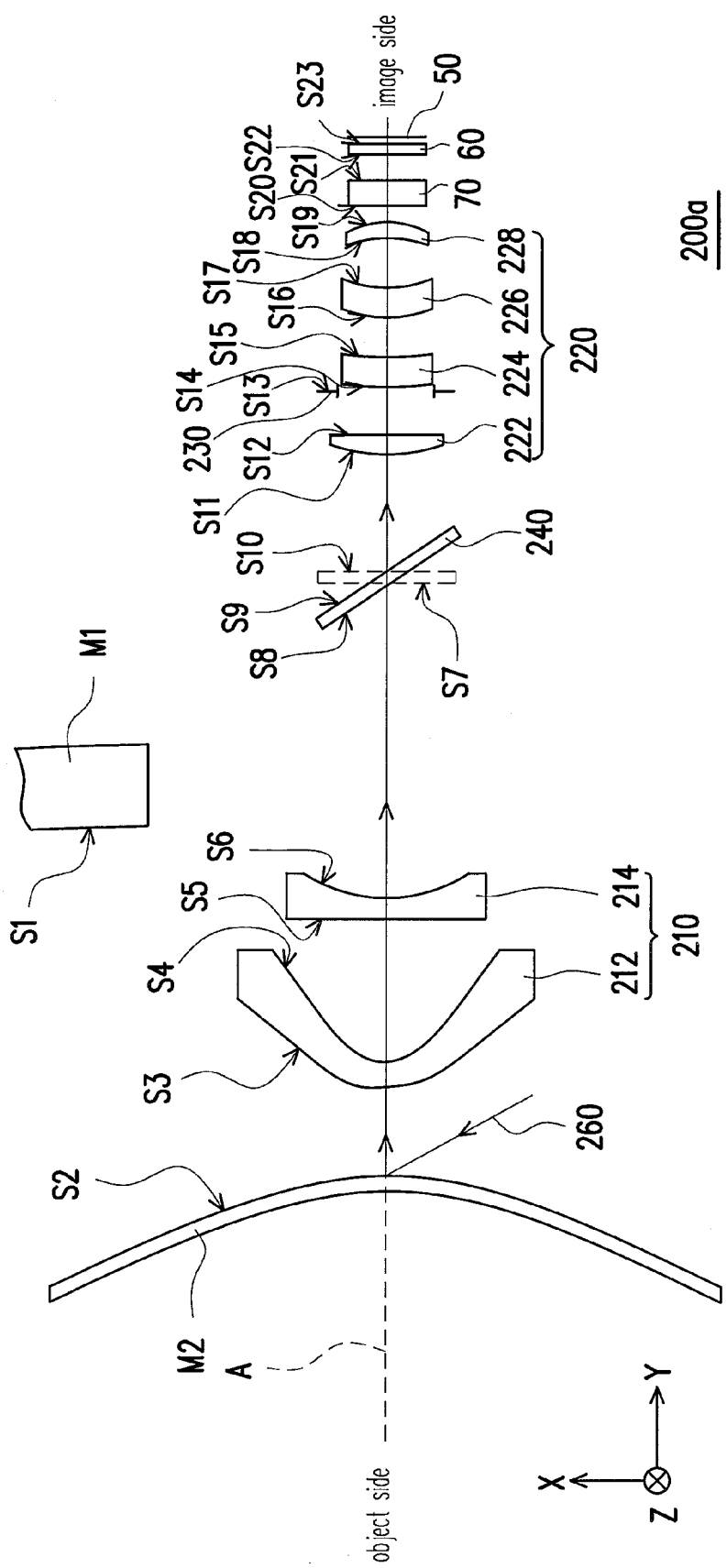
FIG. 10 is a schematic view illustrating the structure of a fixed-focus lens according to another embodiment of the invention.

Referring to FIG. 10, the design concept of the fixed-focus lens 200a of the embodiment is similar to the design concept of the fixed-focus lens 200 (as shown in FIG. 2), and the difference between the two fixed-focus lenses 200a and 200 is that the fixed-focus lens 200a of the embodiment further includes a dichroic mirror 240. The dichroic mirror 240 is disposed in the light path between the first lens group 210 and the second lens group 220 and is adaptive to transmit a non-visible light beam 260 from the first lens group 210 to the second lens group 220. Here, the non-visible light beam 260, for example, is an infrared ray (IR).

An embodiment of the fixed-focus lens 200a is given hereinafter. However, the invention is not limited to the data listed in Table 9. It is known to those ordinary skilled in the art that various modifications and variations may be made to the structure of the invention without departing from the scope or spirit of the invention. The following data listed in Table 10 is relative to rotation and shift of the optical system of the fixed-focus lens 200a, but the invention is not limited to the data described herein.

TABLE 8

| Aspheric Parameter | Conic Coefficient k | Coefficient $A_4$ | Coefficient $A_6$ | Coefficient $A_8$ | Coefficient $A_{10}$ | |
|---|---|---|---|---|---|---|
| S2 | −4.316804 | 1.532573E−07 | −3.673121E−11 | 4.144387E−15 | −1.870013E−19 | |
| S3 | −0.8258598 | −4.619800E−05 | −1.184814E−09 | 3.762010E−11 | −5.339668E−14 | |
| S4 | −0.9694276 | −7.280267E−05 | −1.914470E−07 | 7.458389E−10 | −8.633938E−13 | |
| S5 | −25.98377 | 1.508525E−05 | 1.466849E−08 | −1.386521E−10 | 1.526228E−13 | |
| S6 | 1.749993 | 3.864295E−05 | −4.490439E−08 | 4.870078E−11 | −1.523565E−12 | |

| Aspheric Parameter | Conic Coefficient k | Coefficient $A_4$ | Coefficient $A_6$ | Coefficient $A_8$ | Coefficient $A_{10}$ | Coefficient $A_{12}$ |
|---|---|---|---|---|---|---|
| S16 | −0.6181297 | 2.951314E−05 | −3.687290E−07 | 1.965174E−09 | −6.689314E−11 | 3.839140E−14 |
| S17 | −4.119267 | 7.820356E−05 | −1.028110E−06 | 9.928271E−09 | −2.205517E−10 | 1.232519E−12 |

Figure 9A:
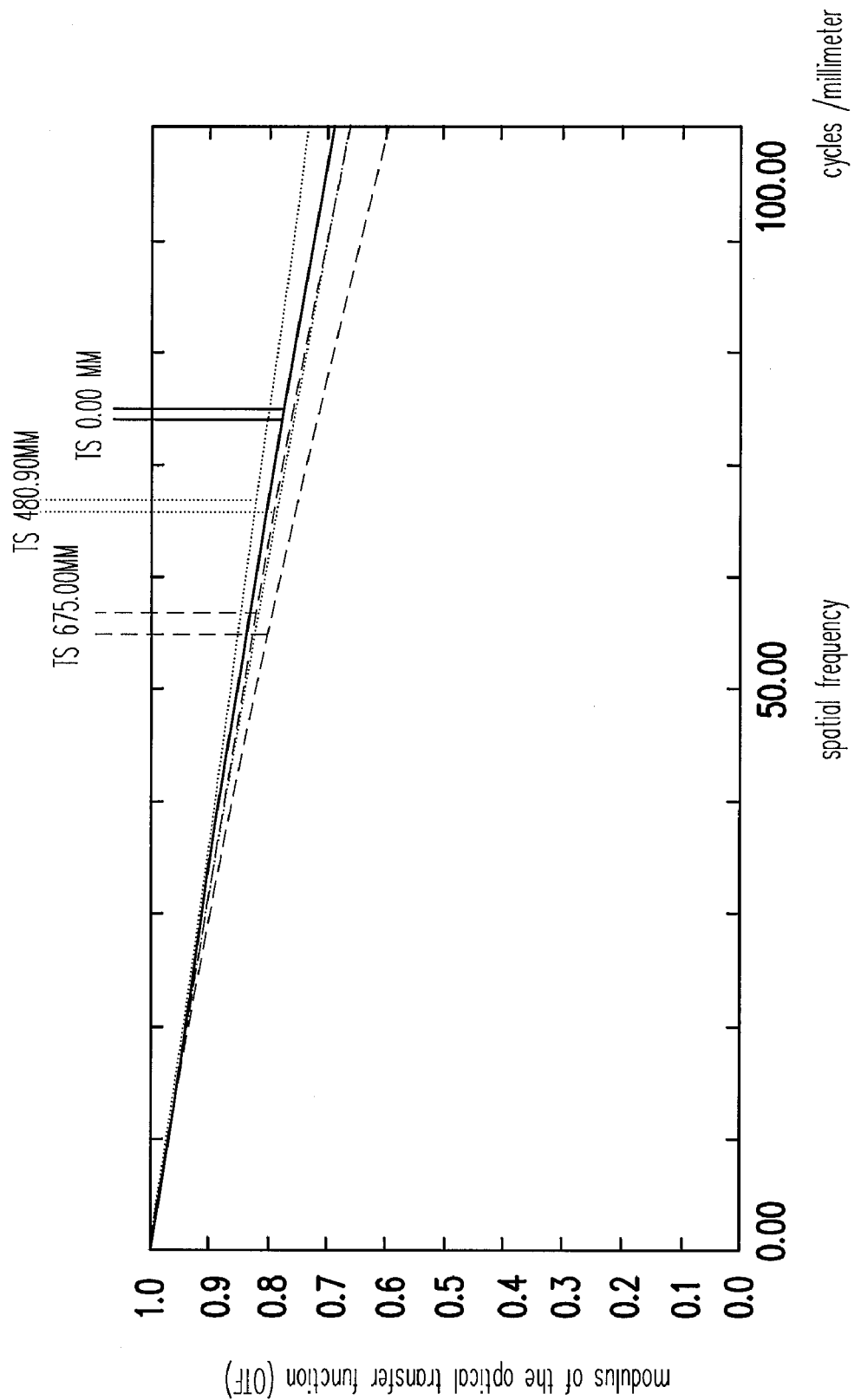
FIGS. 9A and 9B are diagrams showing the optical imaging simulation data of the fixed-focus lens in FIG. 8.
Figure 9B:
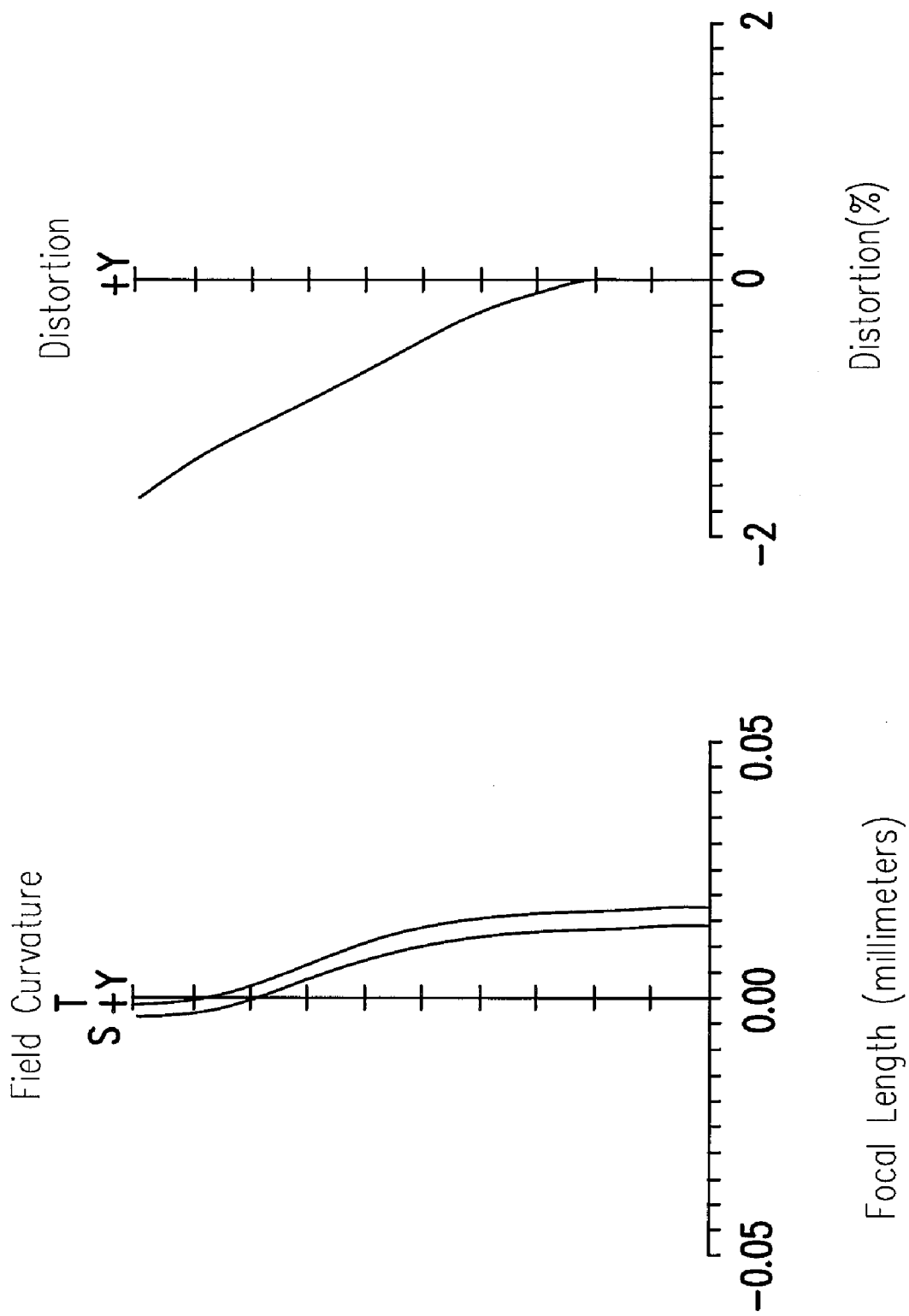

Referring to FIGS. 9A and 9B, FIG. 9A is a modulation transfer function (MTF) graph, and in the MTF graph the transverse axis indicates a spatial frequency in cycles per millimeter, and the longitudinal axis indicates a modulus of the optical transfer function (OTF). FIG. 9A is a simulation data diagram obtained with light having wavelengths ranging from 830 nm to 870 nm. Moreover, FIG. 9B shows graphics of a field curvature and a distortion respectively from left to right and is simulated with a light having a wavelength of 850 nm. Since both the graphics shown in FIGS. 9A and 9B fall within a standard range, the fixed-focus lens 500 of this embodiment maintains a good imaging quality while having a large FOV.

Similarly, if the distance from the first lens group 510 to the second lens group 520 is $T_{12}$, and the EFL of the second lens group 520 is $f_2$, the two lens groups 510 and 520 satisfy the following condition: $1.8<T_{12}/f_2<4.5$. In the embodiment, $T_{12}/f_2$ is 2.737, thus satisfying the above-described condition. Besides, with use of the reflector M1 and the curved reflector M2 together with the first lens group 510 and the second lens group 520, the maximum FOV of the fixed-focus lens 500 may arrive at about 164.5 degrees. The EFL f of the fixed-focus lens 500 is 1.33 millimeter, and the numerical aperture (F/#) of the fixed-focus lens 500 is 2.4. In the embodiment, $f/f_2$ is 0.054395 and f/D is 0.093, so that the conditions, i.e., $0.04<f/f_2<0.078$ and $0.05<f/D<0.18$, are respectively satisfied. Besides, the fixed-focus lens 500 further includes an aperture stop 540 disposed in the light path between the third lens 522 and the fourth lens 524.

TABLE 9

| Surface | Curvature Radius (mm) | Distance (mm) | Index of Refraction | Abbe Number | Notes |
|---|---|---|---|---|---|
| S1 | −3200 | −91 | | | Reflector |
| S2 | −61.43 | 33 | | | Curved Reflector |
| S3 | 11.68 | 4 | 1.53 | 55.95 | First Lens |
| S4 | 6.20 | 21.55 | | | |
| S5 | −82.40 | 3 | 1.53 | 55.95 | Second Lens |
| S6 | 32.31 | 70.69 | | | |
| S7 | | 0 | | | |
| S8 | infinity | 1.1 | 1.52 | 64.17 | Dichroic Mirror |
| S9 | infinity | 0 | | | |
| S10 | | 5.62 | | | |
| S11 | 25.58 | 2 | 1.49 | 70.24 | Third Lens |
| S12 | −2918.85 | 6.14 | | | |
| S13 | infinity | 0.1 | | | Aperture Stop |
| S14 | 15.22 | 3.57 | 1.49 | 70.24 | Fourth Lens |
| S15 | 27.42 | 5.27 | | | |
| S16 | 12.40 | 3.71 | 1.53 | 55.95 | Fifth Lens |
| S17 | 15.64 | 5.81 | | | |
| S18 | −12.05 | 2.05 | 1.53 | 55.95 | Sixth Lens |
| S19 | −7.09 | 1.88 | | | |
| S20 | infinity | 3.05 | 1.52 | 64.17 | Filter |
| S21 | infinity | 4 | | | |
| S22 | infinity | 0.65 | 1.52 | 64.17 | Cover Glass |
| S23 | infinity | 0.42 | | | |

TABLE 10

| Surface | X-shift | Y-shift | Z-shift | X-tilt | Y-tilt | Z-tilt |
|---|---|---|---|---|---|---|
| S7 | 0 | 0 | 0 | 0 | 41 | 0 |
| S10 | −0.32865 | 0 | 0 | 0 | −41 | 0 |

In Table 9, the distance refers to a linear distance along an optical axis A between two neighboring surfaces. For example, the distance of the surface S3 is the linear distance along the optical axis A between the surface S3 and the surface S4. The corresponding thickness, refractive index, and Abbe number of each lens in the Notes column refer to the numeral value of each distance, refractive index, and Abbe number in the same row. Moreover, in Table 9, the surfaces S1 and S2 are respectively two reflecting surfaces of the reflector M1 and the curved reflector M2, the surfaces S3 and S4 are two surfaces of the first lens 212, the surfaces S5 and S6 are two surfaces of the second lens 214, the surfaces S11 and S12 are two surfaces of the third lens 222, the surface S13 is the aperture stop 230, the surfaces S14 and S15 are two surfaces of the fourth lens 224, the surfaces S16 and S17 are two surfaces of the fifth lens 226, and the surfaces S18 and S19 are two surfaces of the sixth lens 228. The surfaces S20 and S21 are two surfaces of the filter 70, and the surfaces S22 and S23 are two surfaces of the cover glass 60 used in the light detector 50, wherein the distance listed in the row of the surface S23 is the distance from the surface S23 to the light detector 50. The numeral values of the parameters such as the radius of curvature and the distance of each surface are given in Table 9 and may not be repeated herein again.

Moreover, the above surfaces S2-S6 and S16-S19 are aspheric surfaces with even power, and the formula and the parameters herein are the same as those in Table 2, wherein the surfaces S16-S19 respectively correspond to the surfaces S12-S15 of Table 2.

Referring to Table 9 and Table 10 at the same time, the surfaces S7 and S10 are respectively datum planes of the dichroic mirror 240 and each of the optical elements between the dichroic mirror 240 and the image side, wherein the datum planes are reference surfaces relative to rotation and shift of the optical system of the fixed-focus lens 200a. For example, in the embodiment, the surface S8 of the dichroic mirror 240 rotates 41 degrees relative to the surface S7 in a counter clockwise direction, so that each of the optical elements between the dichroic mirror 240 and the image side also rotates 41 degrees relative to the optical axis A in a counter clockwise direction. Afterwards, the other surface S9 of the dichroic mirror 240 further rotates 41 degrees relative to the surface S8 of the dichroic mirror 240 in a clockwise direction, so as to correspond to the surface S10. Meanwhile, the optical axis of each of the optical elements between the dichroic mirror 240 and the image side is not parallel to the optical axis A. Thereafter, in order to compensate and reduce the offset of the non-visible light due to the included angle, i.e. 41 degrees, between the dichroic mirror 240 and the optical axis A resulted in a poor imaging quality, each of the optical elements between the dichroic mirror 240 and the image side is slightly shifted relative to the surface S10, so that a phenomenon that the optical axis of the first lens group 210 and the optical axis of the second lens group 220 are not parallel to each other, is compensated. Accordingly, the imaging quality of the fixed-focus lens 200a is enhanced.

Figure 11A:
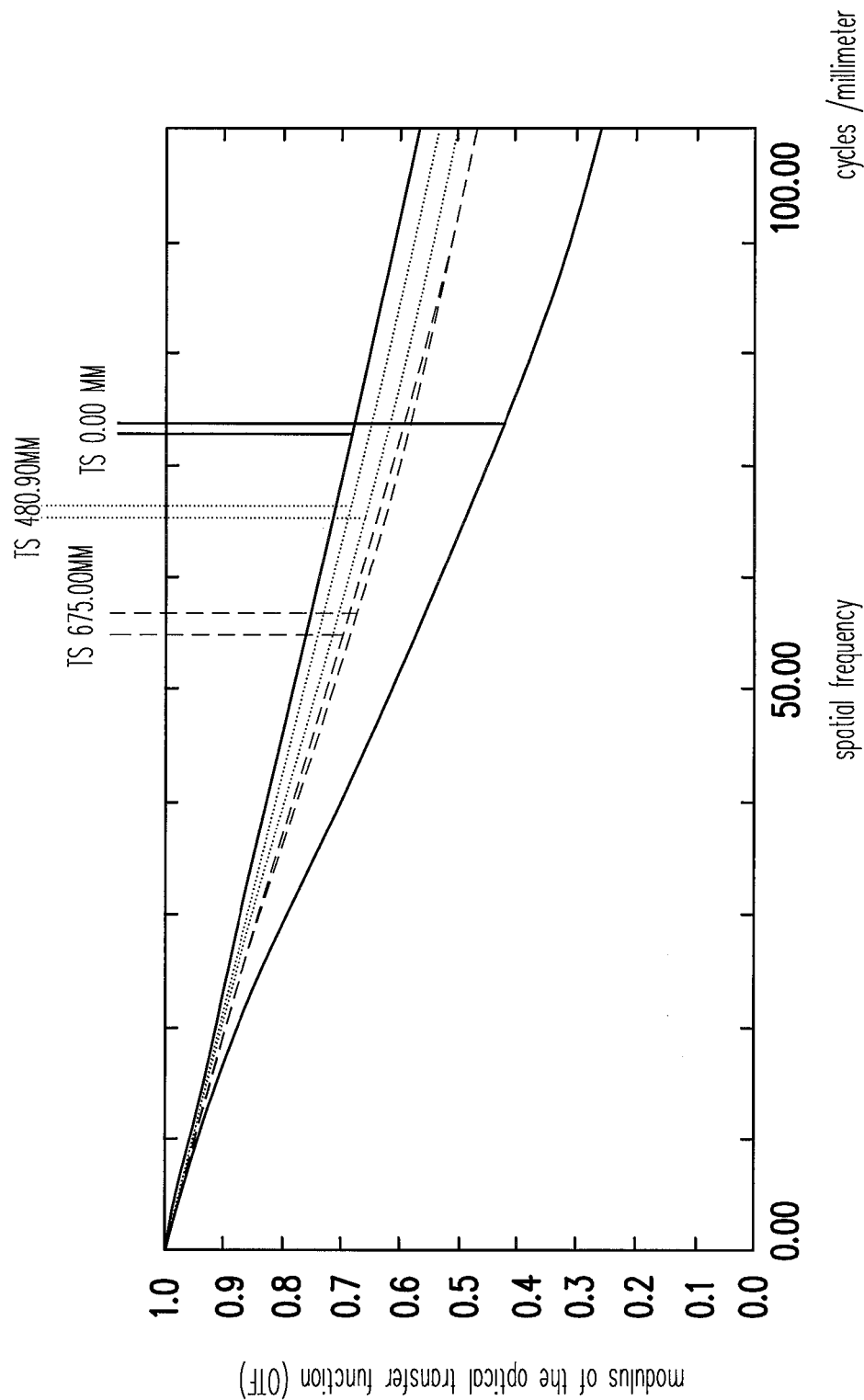
FIGS. 11A and 11B are diagrams showing the optical imaging simulation data of the fixed-focus lens in FIG. 10.
Figure 11B:
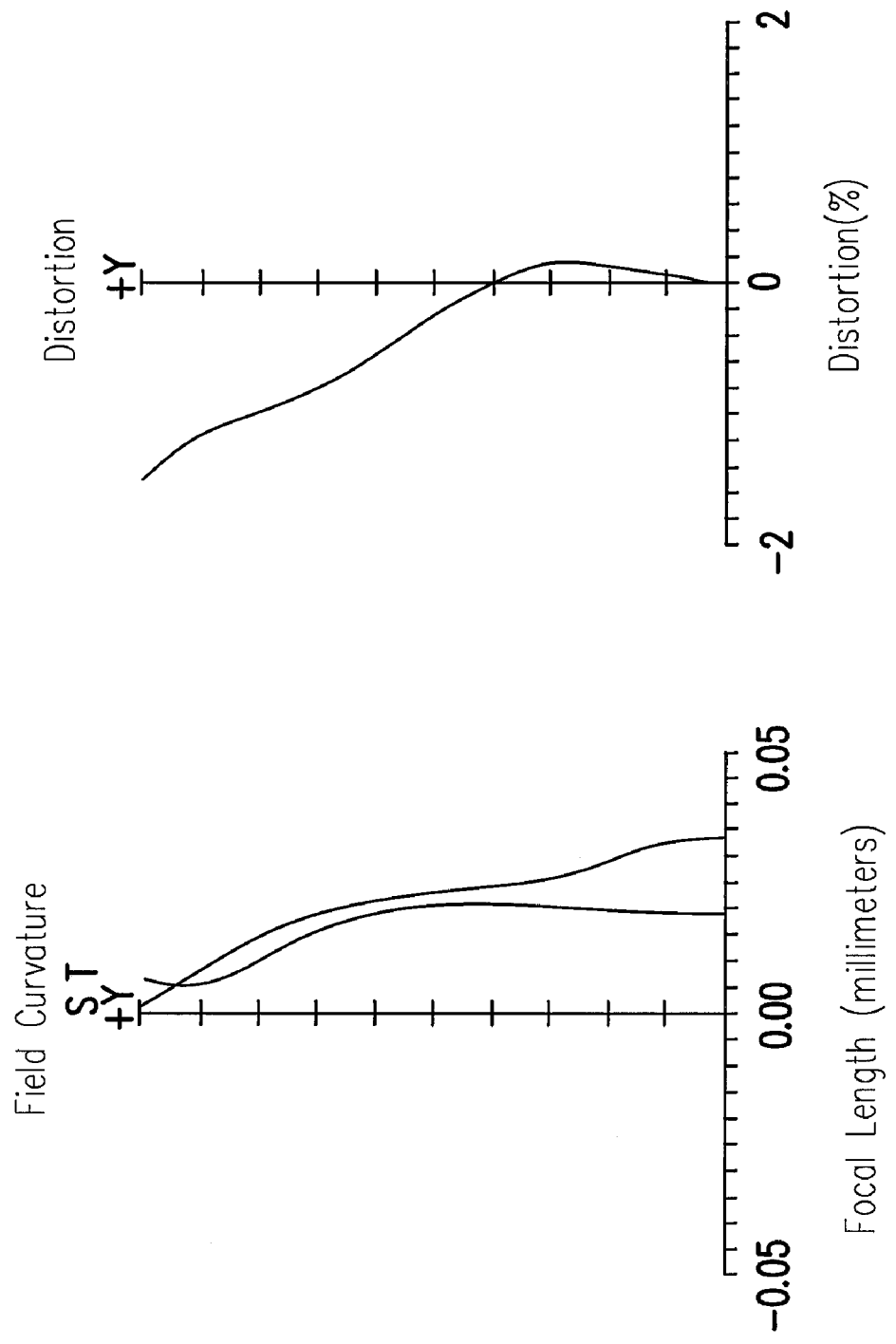

Referring to FIGS. 11A and 11B, FIG. 11A is a modulation transfer function (MTF) graph, and in the MTF graph the transverse axis indicates a spatial frequency in cycles per millimeter, and the longitudinal axis indicates a modulus of the optical transfer function (OTF). FIG. 11A is a simulation data diagram obtained with light having wavelengths ranging from 850 nm to 870 nm. Moreover, FIG. 11B shows graphics of a field curvature and a distortion respectively from left to right, and is simulated with a light having a wavelength of 850 nm. Since both the graphics shown in FIGS. 11A and 11B fall within a standard range, the fixed-focus lens 200a of this embodiment maintains a good imaging quality while having a large FOV.

Figure 12:
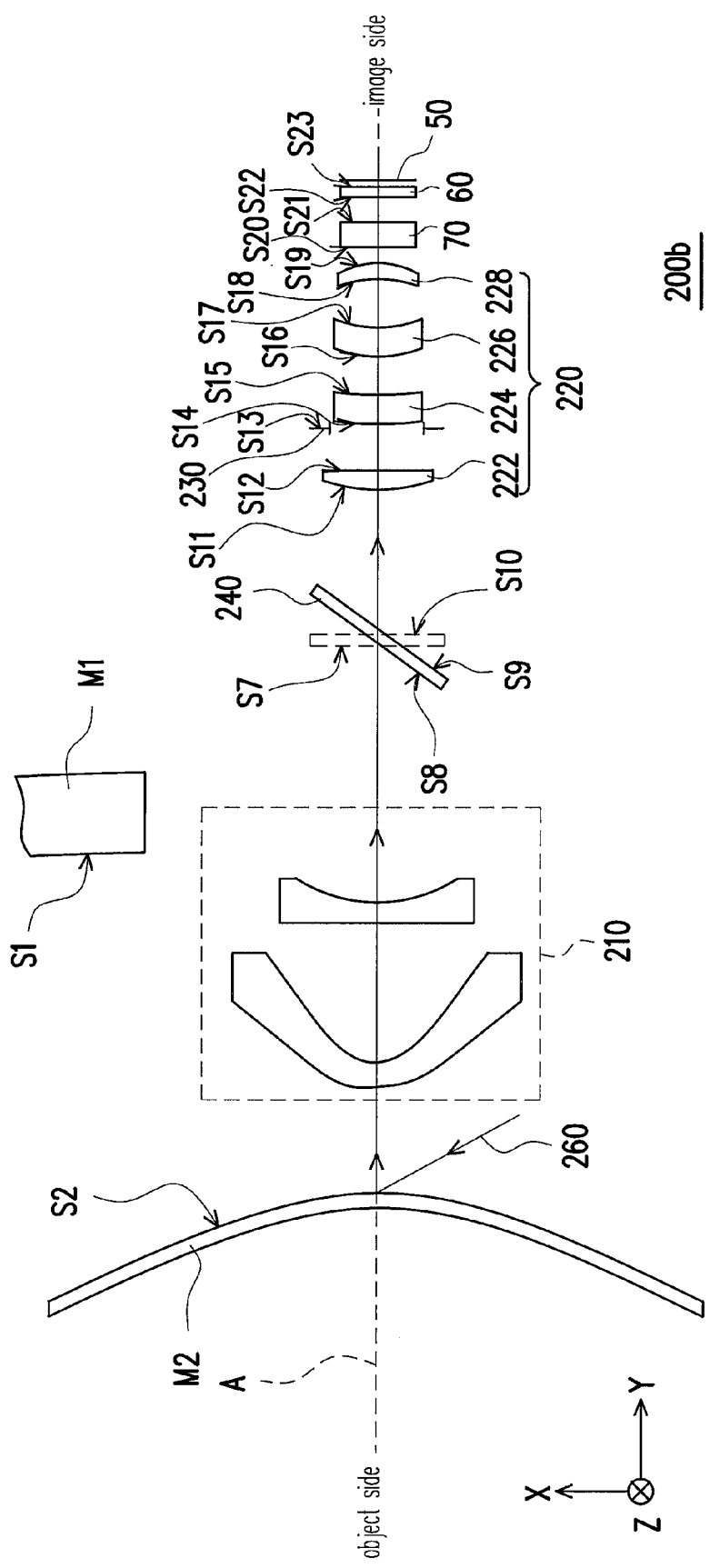
FIG. 12 is a schematic view illustrating the structure of a fixed-focus lens according to another embodiment of the invention.

Referring to FIG. 12, the design concept of the fixed-focus lens 200b of the embodiment is similar to the design concept of the fixed-focus lens 200a (as shown in FIG. 10), and the difference between the two fixed-focus lenses 200b and 200a is that the included angle between the dichroic mirror 240 and the optical axis A in the fixed-focus lens 200b of the embodiment has different directions.

The following data listed in Table 11 is relative to rotation and shift of the optical system of the fixed-focus lens 200b, but the invention is not limited to the data described herein.

TABLE 11

| Surface | X-shift | Y-shift | Z-shift | X-tilt | Y-tilt | Z-tilt |
|---|---|---|---|---|---|---|
| S7 | 0 | 0 | 0 | 0 | −41 | 0 |
| S10 | +0.32865 | 0 | 0 | 0 | 41 | 0 |

Similarly, referring to Table 11, the surfaces S7 and S10 are respectively datum planes of the dichroic mirror 240 and each of the optical elements between the dichroic mirror 240 and the image side, wherein the datum planes are reference surfaces relative to rotation and shift of the optical system of the fixed-focus lens 200b. Different from the fixed-focus lens 200a, the fixed-focus lens 200b in the embodiment has the surface S8 of the dichroic mirror 240 rotating 41 degrees relative to the surface S7 in a clockwise direction, so that each of the optical elements between the dichroic mirror 240 and the image side also rotates 41 degrees relative to the optical axis A in a clockwise direction. Afterwards, the other surface S9 of the dichroic mirror 240 further rotates 41 degrees relative to the surface S8 of the dichroic mirror 240 in a counter clockwise direction, so as to correspond to the surface S10. Meanwhile, the optical axis of each of the optical elements between the dichroic mirror 240 and the image side is not parallel to the optical axis A. Thereafter, each of the optical elements between the dichroic mirror 240 and the image side is further slightly shifted relative to the surface S10, so that a phenomenon that the optical axis of the first lens group 210 and the optical axis of the second lens group 220 are not parallel to each other is compensated. Accordingly, the offset of the non-visible light due to the included angle, i.e., 41 degrees, between the dichroic mirror 240 and the optical axis A resulted in a poor imaging quality, is reduced.

The design concepts of the fixed-focus lenses having the dichroic mirrors shown in FIGS. 10 and 12 are able to be implemented in the fixed-focus lenses as shown in FIGS. 4, 6, and 8, and the arrangement of the fixed-focus lenses does not limit to the invention. It will be apparent to one of the ordinary skill in the art that modifications of the described embodiments may be made without departing from the spirit of the invention.

Figure 13:
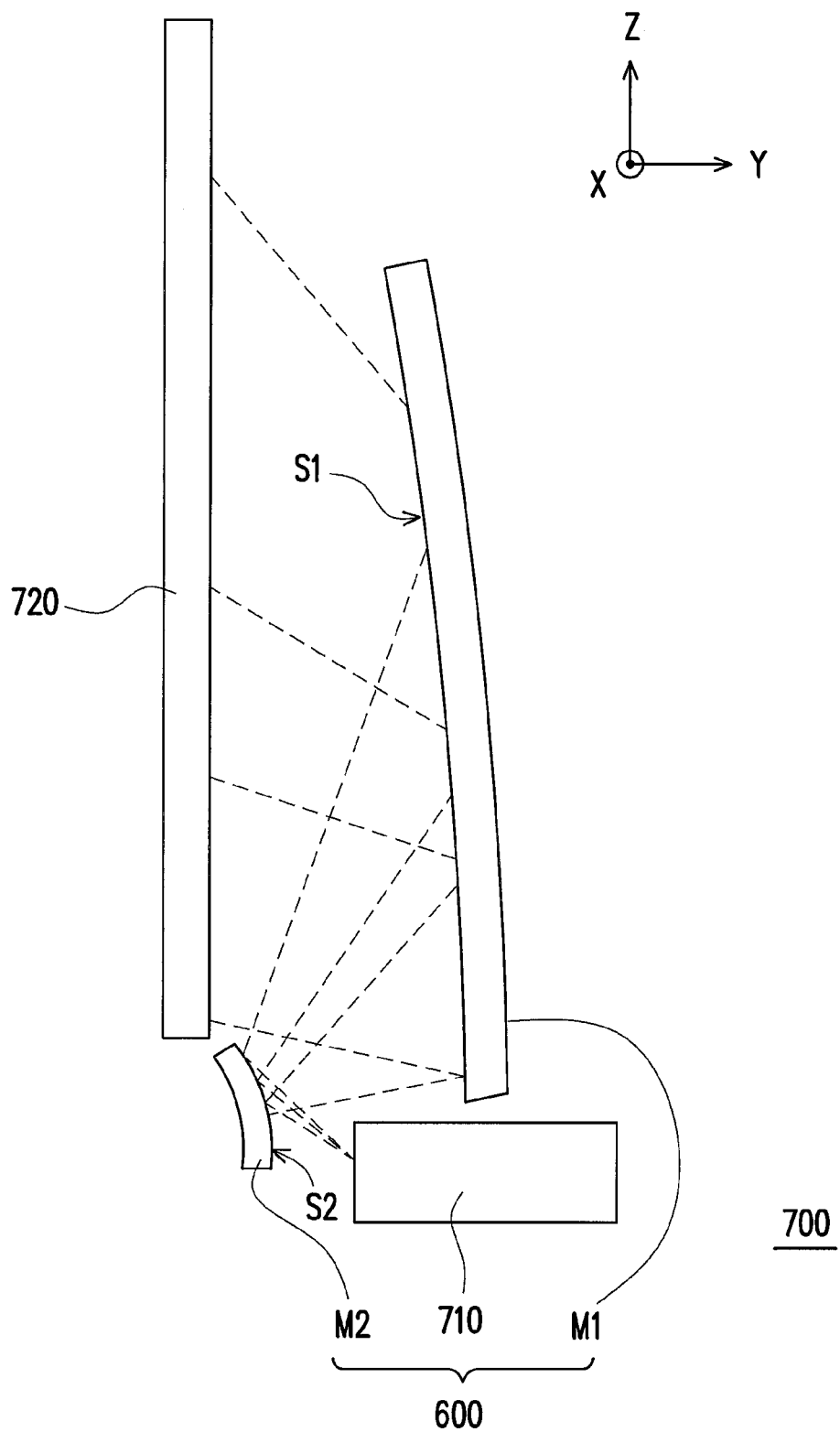
FIGS. 13 and 14 are schematic diagrams of a touch screen with different view angles according to an embodiment of the invention.
Figure 14:
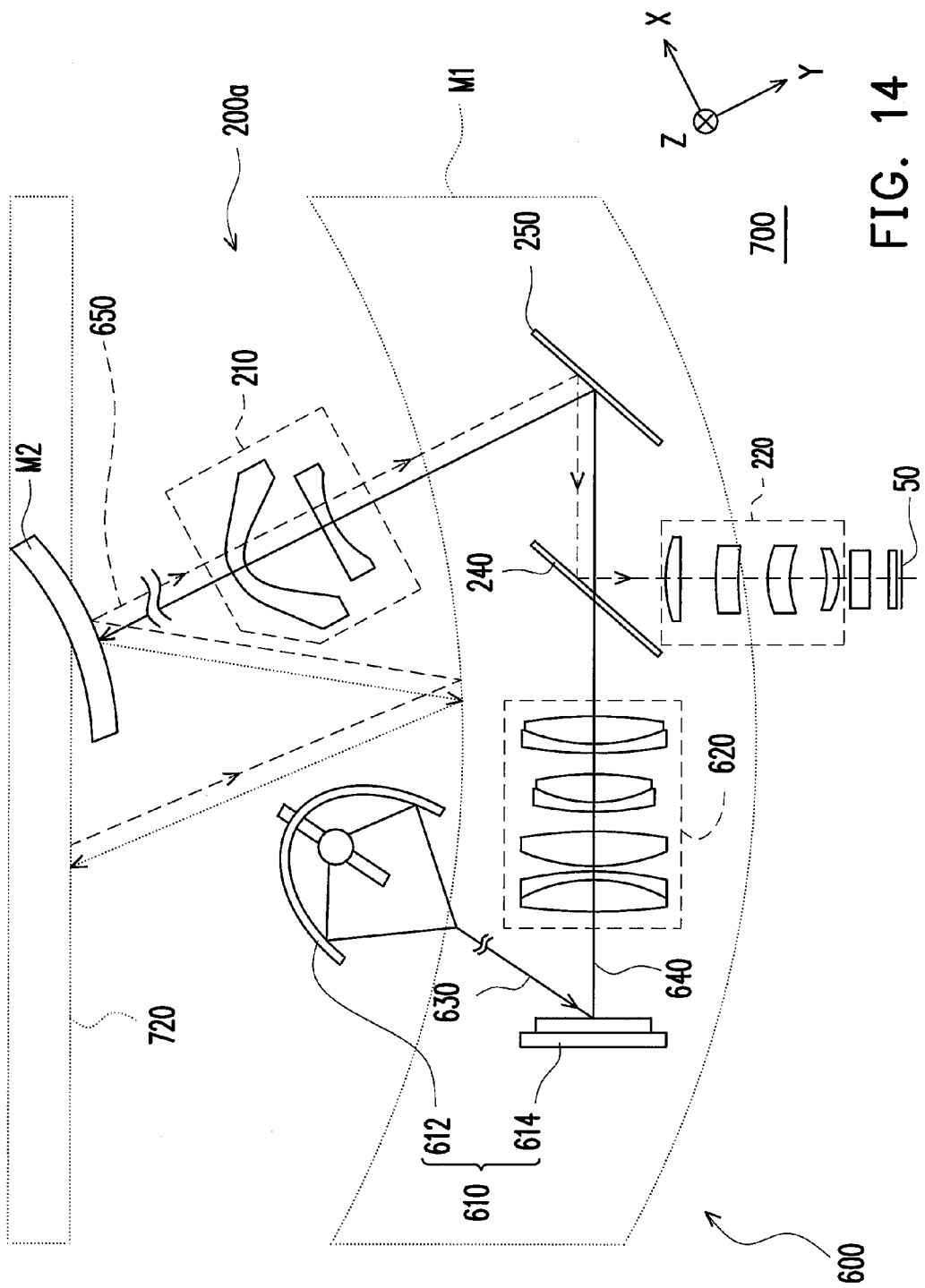

Referring to FIGS. 13 and 14, in the embodiment, the touch screen 700 includes an apparatus 600 integrating optical projection and image detection and a screen 720. The optical machinery 710 shown in FIG. 13 is parts of the apparatus 600 integrating optical projection and image detection except for the reflector M1 and the curved reflector M2. Here, in order to specifically show each of the optical elements in the apparatus 600 integrating optical projection and image detection, the optical elements of the touch screen as shown in FIGS. 13 and 14 are not illustrated according to the actual scale. The apparatus 600 integrating optical projection and image detection includes the fixed-focus lens 200*a* shown in FIG. 14, a light detector 50, an optical engine 610, and a third lens group 620, wherein the optical engine 610 includes a light source 612 and a light valve 614.

Please refer to FIGS. 13 and 14 again. The light source 612 is adaptive to provide a light beam 630, and the light valve 614 is disposed in the transmission path of the light beam 630 so as to convert the light beam 630 to an image beam 640. In the embodiment, the light valve 614, for example, is a digital micro-mirror device (DMD) or a liquid-crystal-on-silicon panel (LCOS panel). The third lens group 620 is disposed in the transmission path of the image beam 640 so as to project the image beam 640 onto the screen 720. As shown in FIG. 14 the fixed-focus lens 200*a* includes a dichroic mirror 240 and a reflecting element 250 to integrate the functions of optical projection and image detection. The dichroic mirror 240 is adaptive to reflect a non-visible light beam 650 to the light detector 50 and let the image beam 640 pass through. In the embodiment, the non-visible light beam 650, for example, is an infrared ray (IR). Specifically, the dichroic mirror 240 is disposed at the intersection of the optical axes of the third lens group 620 and the second lens group 220 and in the light path between the first lens group 210 and the second lens group 220. After passing through the dichroic mirror 240, the image beam 640 is further transmitted to the first lens group 210 through the reflecting element 250. The non-visible light beam 650 from the first lens group 210 is also transmitted to the second lens group 220 through the reflecting element 250 and the dichroic mirror 240.

As a result, when users touch the screen 720, the light detector 50 senses the variation of the optical image on the screen 720, so that the function of a touch screen is achieved. Besides, the light detector 50 also records the sensed variation of the image. In other words, when users note data on the screen 720, the noted data are recorded in real time. Accordingly, the touch screen 700 of the embodiment utilizes the apparatus 600 integrating optical projection and image detection to integrate the functions of optical projection and image detection, so that the image-detecting optical length with respect to the screen 720 at the object side in the fixed-focus lens 200*a* is effectively shortened. Moreover, the reflector M1, the curved reflector M2, and the first lens group 210 of the fixed-focus lens 200*a* also shorten a projecting optical length. As a result, since the image-detecting optical length and the protecting optical length are both shortened, the volume of the touch screen 700 is reduced, and so is the thickness of the touch screen 700. Besides, the touch screen 700 has good optical properties.

Figure 15:
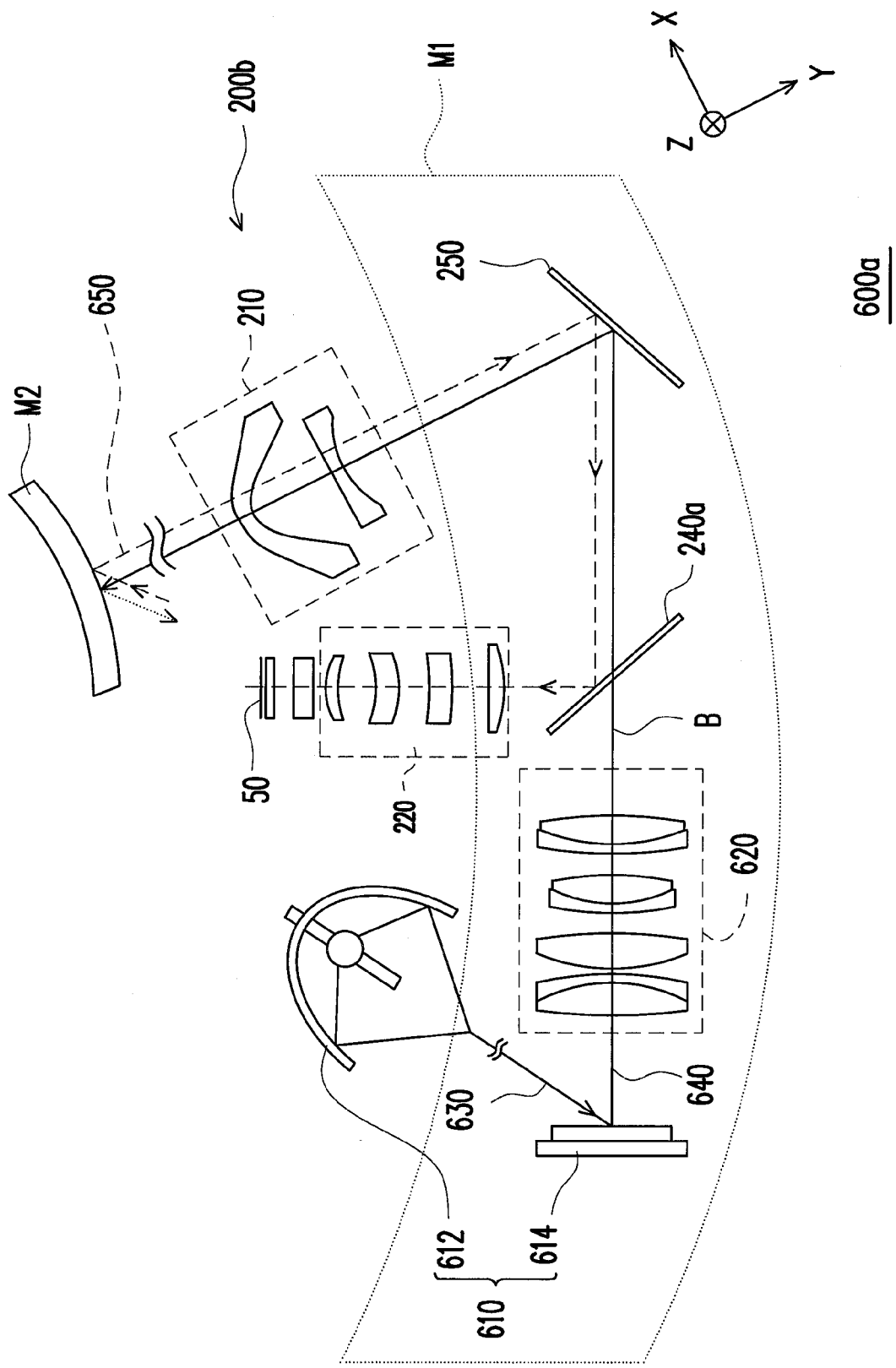
FIG. 15 is a schematic diagram of an apparatus integrating optical projection and image detection according to another embodiment of the invention.

Referring to FIG. 15, in order to specifically show each of the optical elements in the apparatus integrating optical projection and image detection, the optical elements of the touch screen as shown in FIG. 15 are not illustrated according to the actual scale. Referring to FIG. 15, the apparatus 600*a* integrating optical projection and image detection of the embodiment is similar to the apparatus 600 integrating optical projection and image detection as shown in FIG. 14, while the main difference between the apparatuses 600*a* and 600 lies in that the direction of the included angle between the dichroic mirror 240*a* and the optical axis B of the third lens group 620 in the embodiment is different from the direction of the included angle between the dichroic mirror 240 and the optical axis B of the third lens group 620. Similarly, when the dichroic mirror 240*a* is applied to the touch screen 700 according to the arrangement discussed in the embodiment, the optical length of the optical system may also be effectively shortened, so that the volume of the touch screen 700 is reduced, and so is the thickness of the touch screen 700.

Figure 16:
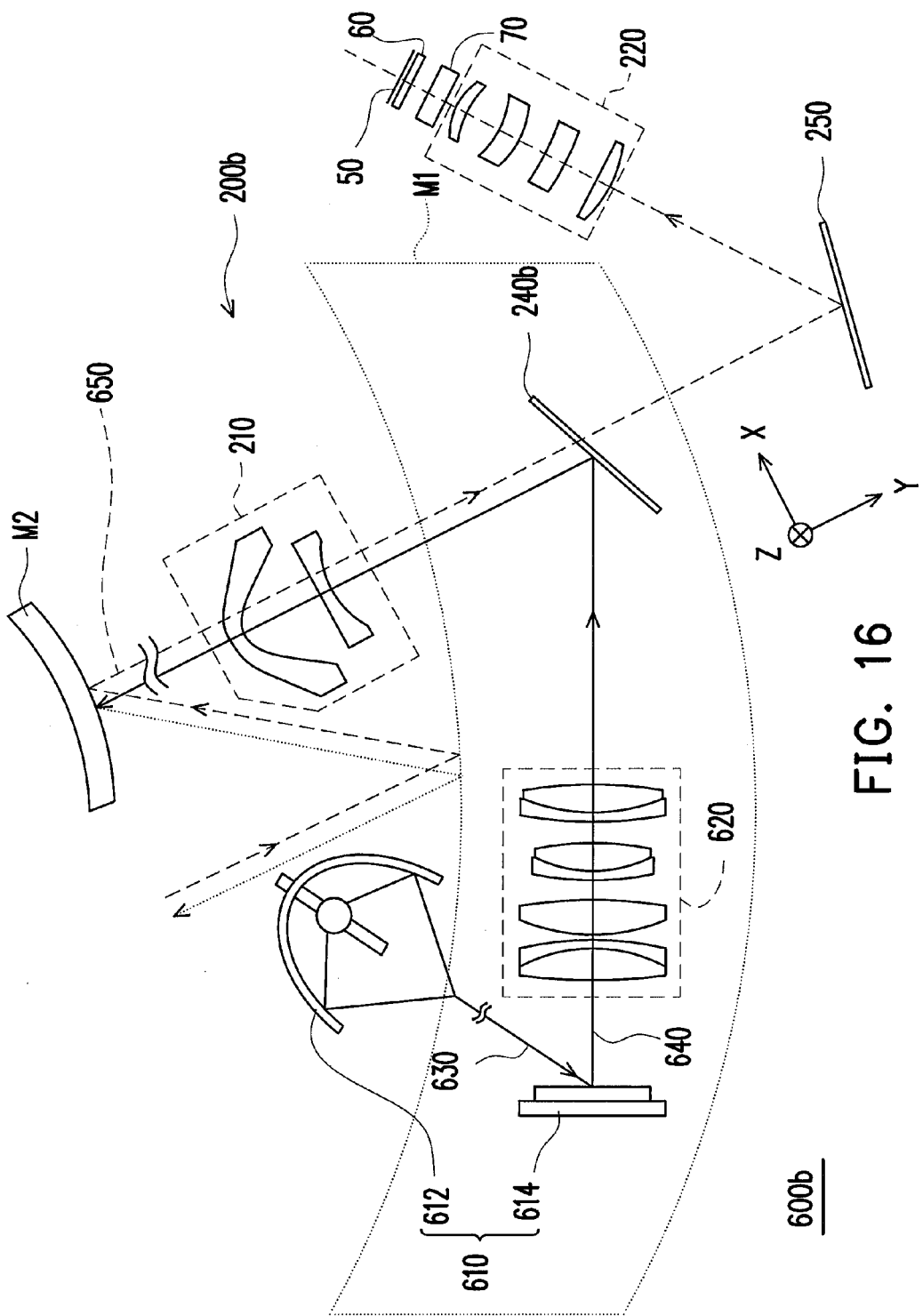
FIG. 16 is a schematic diagram of an apparatus integrating optical projection and image detection according to another embodiment of the invention.

Referring to FIG. 16, in order to specifically show each of the optical elements in the apparatus integrating optical projection and image detection, the optical elements of the touch screen as shown in FIG. 16 are not illustrated according to the actual scale. Referring to FIG. 16, the design concept of the apparatus 300*b* integrating optical projection and image detection according to the embodiment is similar to the design concept of the above-described apparatus 600 integrating optical projection and image detection (as shown in FIG. 14), and the difference between the two apparatuses integrating optical projection and image detection is described as follows.

The dichroic mirror 240*b* of the embodiment is adaptive to transmit the image beam 640 to the first lens group 210 and let the non-visible light beam 650 from the first lens group 210 pass through, so that the non-visible light beam 650 is further transmitted to the second lens group 220 through the reflecting element 250. Specifically, the dichroic mirror 240*b* is disposed in the transmission path of the image beam 640 and the non-visible light beam 650. After passing through the dichroic mirror 240*b*, the non-visible light beam 650 is further transmitted to the second lens group 220 through the reflecting element 250. The image beam 640 from the third lens group 620 is transmitted to the first lens group 210 through the dichroic mirror 240*b*.

The invention is not limited to the fixed-focus lens having the reflecting element 250 as shown in FIG. 16, i.e., an L-shaped lens. In other embodiments, it is possible that the fixed-focus lens does not have the reflecting element, so that the first lens group 210 and the second lens group 220 are arranged in a straight line. Accordingly, the fixed-focus lens 200*b* shown in FIG. 16 becomes a straight-line type lens.

The design concepts of the above-described apparatuses integrating optical projection and image detection and the types of the fixed-focus lenses of the apparatuses may have various modifications. For example, the apparatuses integrating optical projection and image detection as shown in FIGS. 14-16 may be implemented by utilizing the fixed-focus lenses shown in FIGS. 4, 6, and 8 so as to be applied to the touch screen. The structural design shown in FIGS. 13-16 are only described with reference to the exemplary embodiments, so that it will be apparent to one of the ordinary skill in the art that modifications of the described embodiments can be made, but the scope of the invention will not be limited.

In view of the above, the fixed-focus lens respectively discussed in the embodiments of the invention uses the reflector and the curved reflector with the first lens group and the second lens group to eliminate image aberration, and the fixed-focus lens may have a wide field of view. Furthermore, the fixed-focus lens uses less reflectors, so that not only the cost of the products is reduced, but also the trouble of aligning the optical axis of the optical system is removed. Accordingly, the apparatus integrating optical projection and image detection adopts the fixed-focus lens to ensure a short projecting optical length and a short image-detecting optical length. Besides, the apparatus may have good optical properties. Therefore, when the apparatus integrating optical projection and image detection as discussed in the embodiments of the invention is applied to the touch screen, the volume of the touch screen is reduced, and so is the thickness of the touch screen. Moreover, in an embodiment of the invention, each of the optical elements between the dichroic mirror and the image side has a slight shift relative to the surface of the dichroic mirror to compensate the offset of the non-visible light due to the included angle between the dichroic mirror and the optical axis and improve the imaging quality.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A fixed-focus lens adapted to be disposed between an object side and an image side, the fixed-focus lens comprising:
    a reflector disposed in a light path between the object side and the image side;
    a curved reflector disposed in the light path between the reflector and the image side;
    a first lens group disposed in the light path between the curved reflector and the image side and comprising a first lens and a second lens arranged in sequence from the object side to the image side, wherein each of the first lens and the second lens is an aspheric lens;
    a second lens group disposed in the light path between the first lens group and the image side and comprising a spherical lens and an aspheric lens, wherein the aspheric lens of the second lens group is closest to the image side in the second lens group; and
    a dichroic minor, disposed in the light path between the first lens group and the second lens group and adapted to transmit a non-visible light from the first lens group to the second lens group,
    wherein an effective focal length of the fixed-focus lens is f, an effective focal length of the second lens group is f2, a clear aperture of the aspheric lens of the second lens group is D, and the fixed-focus lens satisfies at least one of following conditions: $0.04<f/f2<0.078$ and $0.05<f/D<0.18$.

2. The fixed-focus lens as claimed in claim 1, wherein the dichroic mirror is adapted to be passed through by the non-visible light from the first lens group, the non-visible light is transmitted to the second lens group, and a light axis of the first lens group and a light axis of the second lens group are not parallel to each other.

3. The fixed-focus lens as claimed in claim 1, wherein the curved reflector is an aspheric reflector and has a negative refractive power, the first lens group has a negative refractive power, and the second lens group has a positive refractive power.

4. The fixed-focus lens as claimed in claim 1, wherein the first lens and the second lens both have negative refractive powers and the aspheric lens of the second lens group has a positive refractive power.

5. The fixed-focus lens as claimed in claim 1, wherein the first lens is a convex-concave lens with a convex surface facing the object side and the second lens is a biconcave lens.

6. The fixed-focus lens as claimed in claim 1, wherein a distance from the first lens group to the second lens group is T12 and $1.8<T12/f2<4.5$.

7. The fixed-focus lens as claimed in claim 1, wherein the second lens group comprises a third lens, a fourth lens, a fifth lens, and a sixth lens arranged in sequence from the object side to the image side, refractive powers of the third lens, the fourth lens, the fifth lens, and the sixth lens are all positive, the sixth lens is the aspheric lens closest to the image side in the second lens group, and the fifth lens is an aspheric lens.

8. The fixed-focus lens as claimed in claim 7, wherein the third lens is a biconvex lens, each of the fourth lens and the fifth lens is a concave-convex lens with a convex surface facing the object side, and the sixth lens is a concave-convex lens with a convex surface facing the image side.

9. The fixed-focus lens as claimed in claim 7, further comprising an aperture stop, disposed in the light path between the third lens and the fourth lens.

10. The fixed-focus lens as claimed in claim 1, wherein the second lens group comprises a third lens, a fourth lens, and a fifth lens arranged in sequence from the object side to the image side, refractive powers of the third lens, the fourth lens, and the fifth lens are all positive, the fifth lens is the aspheric lens closest to the image side in the second lens group, and the fourth lens is an aspheric lens.

11. The fixed-focus lens as claimed in claim 10, wherein the third lens is a concave-convex lens with a convex surface facing the object side, the fourth lens is a convex-concave lens with a convex surface facing the object side, and the fifth lens is a concave-convex lens with a convex surface facing the image side.

12. The fixed-focus lens as claimed in claim 10, further comprising an aperture stop disposed in the light path between the first lens group and the second lens group.

13. The fixed-focus lens as claimed in claim 1, wherein the second lens group comprises a third lens, a fourth lens, a fifth lens, a sixth lens, and a seventh lens arranged in sequence from the object side to the image side, refractive powers of the third lens, the fourth lens, the fifth lens, the sixth lens, and the seventh lens are sequentially positive, positive, positive, negative, and positive, the seventh lens is the aspheric lens closest to the image side in the second lens group, and the fifth lens is an aspheric lens.

14. The fixed-focus lens as claimed in claim 13, wherein each of the third lens and the fourth lens is a concave-convex lens with a convex surface facing the image side, each of the fifth lens and the seventh lens is a concave-convex lens with a convex surface facing the object side, and the sixth lens is a convex-concave lens with a convex surface facing the image side.

15. The fixed-focus lens as claimed in claim 13, further comprising an aperture stop disposed in the light path between the fourth lens and the fifth lens.

16. The fixed-focus lens as claimed in claim 1, wherein the second lens group comprises a third lens, a fourth lens, a fifth lens, a sixth lens, a seventh lens, and an eighth lens arranged in sequence from the object side to the image side, refractive powers of the third lens, the fourth lens, the fifth lens, the sixth lens, the seventh lens, and the eighth lens are sequentially positive, negative, positive, negative, positive, and positive, the eighth lens is the aspheric lens closest to the image side in the second lens group, the fourth lens and the fifth lens together form a first double cemented lens, and the sixth lens and the seventh lens together form a second double cemented lens.

17. The fixed-focus lens as claimed in claim 16, wherein each of the third lens, the fifth lens, the seventh lens, and the eighth lens is a biconvex lens, the fourth lens is a biconcave lens, and the sixth lens is a convex-concave lens with a convex surface facing the object side.

18. The fixed-focus lens as claimed in claim 16, further comprising an aperture stop disposed in the light path between the third lens and the fourth lens.

19. The fixed-focus lens as claimed in claim 1, further comprising a reflecting element disposed in the light path between the first lens group and the second lens group.

20. An apparatus integrating optical projection and image detection, the apparatus comprising:
a fixed-focus lens adapted to be disposed between an object side and an image side so as to image an object beam from the object side on the image side, the fixed-focus lens comprising:
a reflector disposed in a light path of the object beam between the object side and the image side;
a curved reflector disposed in the light path of the object beam between the reflector and the image side; and
a first lens group disposed in the light path of the object beam between the curved reflector and the image side and comprising a first lens and a second lens arranged in sequence from the object side to the image side, wherein each of the first lens and the second lens is an aspheric lens;
a second lens group disposed in the light path of the object beam between the first lens group and the image side and comprising a spherical lens and an aspheric lens, wherein the aspheric lens of the second lens group is closest to the image side in the second lens group; and
a dichroic mirror disposed in the light path of the object beam between the first lens group and the second lens group, wherein an effective focal length of the fixed-focus lens is f, an effective focal length of the second lens group is f2, a clear aperture of the aspheric lens of the second lens group is D, and the fixed-focus lens satisfies at least one of following conditions: $0.04<f/f2<0.078$ and $0.05<f/D<0.18$;
a light detector disposed at the image side; and
an optical engine adapted to emit an image beam, wherein the image beam is transmitted to the dichroic minor, the dichroic mirror is capable of allowing the image beam to be transmitted to the first lens group, and the image beam is capable of passing through the first lens group and is reflected to the object side by the reflector and the curved reflector.

21. The apparatus integrating optical projection and image detection as claimed in claim 20, wherein the object beam is a non-visible light beam and the image beam is a visible light beam.

22. The apparatus integrating optical projection and image detection as claimed in claim 20, wherein the curved reflector is an aspheric reflector and has a negative refractive power, the first lens group has a negative refractive power, and the second lens group has a positive refractive power.

23. The apparatus integrating optical projection and image detection as claimed in claim 20, wherein the first lens and the second lens both have negative refractive powers and the aspheric lens of the second lens group has a positive refractive power.

24. The apparatus integrating optical projection and image detection as claimed in claim 20, wherein a distance from the first lens group to the second lens group is T12 and $1.8<T12/f2<4.5$.

* * * * *